United States Patent [19]

Marouf et al.

[11] Patent Number: 4,499,578
[45] Date of Patent: Feb. 12, 1985

[54] METHOD AND APPARATUS FOR CONTROLLING SIGNAL LEVEL IN A DIGITAL CONFERENCE ARRANGEMENT

[75] Inventors: Mohamed A. Marouf; Paul W. Vancil, both of Lisle, Ill.

[73] Assignee: AT&T Bell Laboratories, Murray Hill, N.J.

[21] Appl. No.: 437,740

[22] Filed: Oct. 29, 1982

Related U.S. Application Data

[63] Continuation-in-part of Ser. No. 382,672, May 27, 1982, Pat. No. 4,475,190.

[51] Int. Cl.³ ............................................. H04M 3/56
[52] U.S. Cl. .................................. 370/62; 179/18 BC
[58] Field of Search ....................... 370/62; 179/18 BC

[56] References Cited

U.S. PATENT DOCUMENTS

| | | | |
|---|---|---|---|
| 4,197,429 | 4/1980 | Sparber | 179/18 |
| 4,268,716 | 5/1981 | Groves et al. | 179/18 BC |
| 4,276,639 | 6/1981 | Fukuda et al. | 370/62 |
| 4,316,059 | 2/1982 | Toth | 179/1 |
| 4,325,139 | 4/1982 | Van Dine | 179/18 BC |
| 4,359,603 | 11/1982 | Heaton | 370/62 |
| 4,389,720 | 6/1983 | Baxter et al. | 370/62 |

OTHER PUBLICATIONS

Bell System Practices, AT&T Co. Standard, "Toll Conference Service Multiport Conference Bridge Description", Issue 1, pp. 1–13, May, 1969.

*Primary Examiner*—Douglas W. Olms
*Assistant Examiner*—Wellington Chin
*Attorney, Agent, or Firm*—Richard J. Godlewski; Charles H. Davis

[57] ABSTRACT

For use in multiport digital conference arrangements wherein speech samples of selected speakers are summed for distribution to the conferees, the disclosed method and apparatus controls the level of speech represented by information samples to be included in an output sample for distribution to the ports and equalizes the speech level between speakers to reduce speech level contrast heard by the conferees. In addition, a speech detector for each port and microprocessor-controlled switching hardware also adjust the signal level represented by samples received on the ports to effect speaker selection. Furthermore, gain coefficients for a port may be incrementally adjusted during a predetermined period of time to avoid noticeable signal level changes when implementing speaker selection.

32 Claims, 29 Drawing Figures

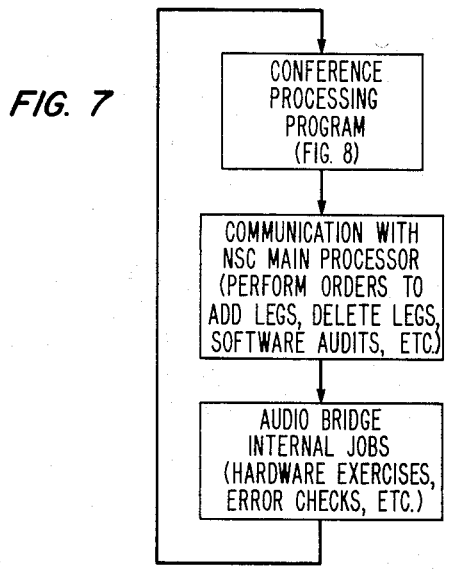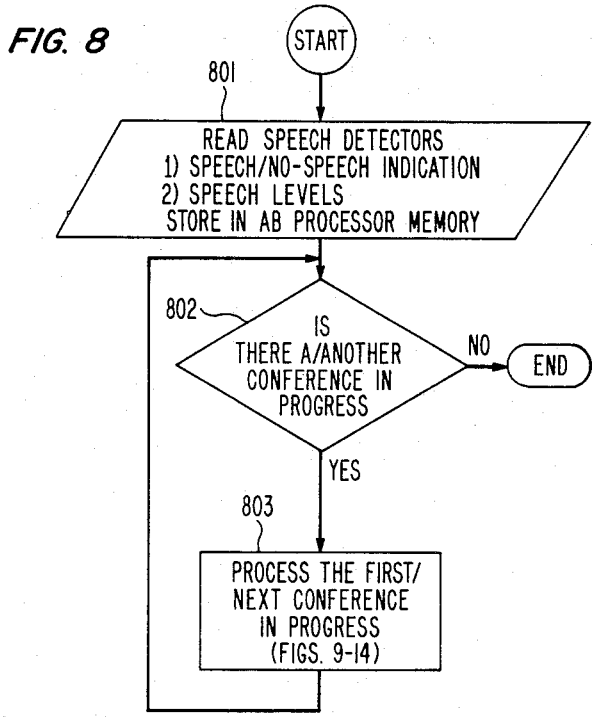

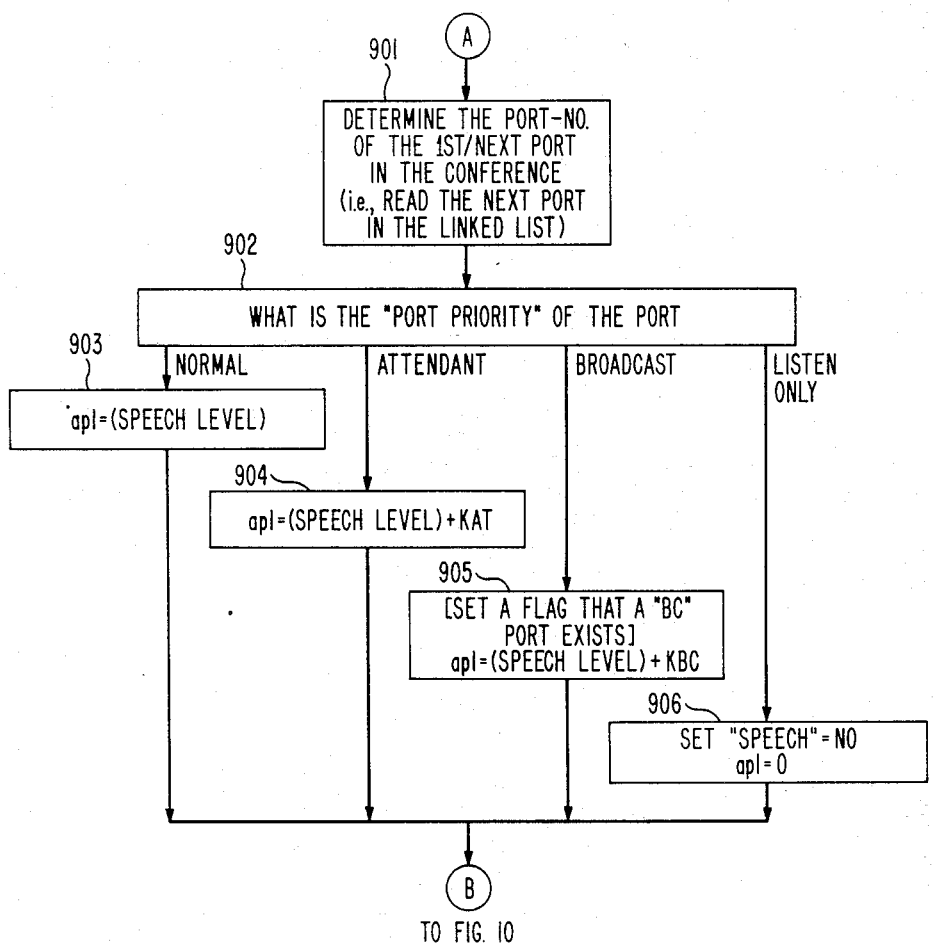

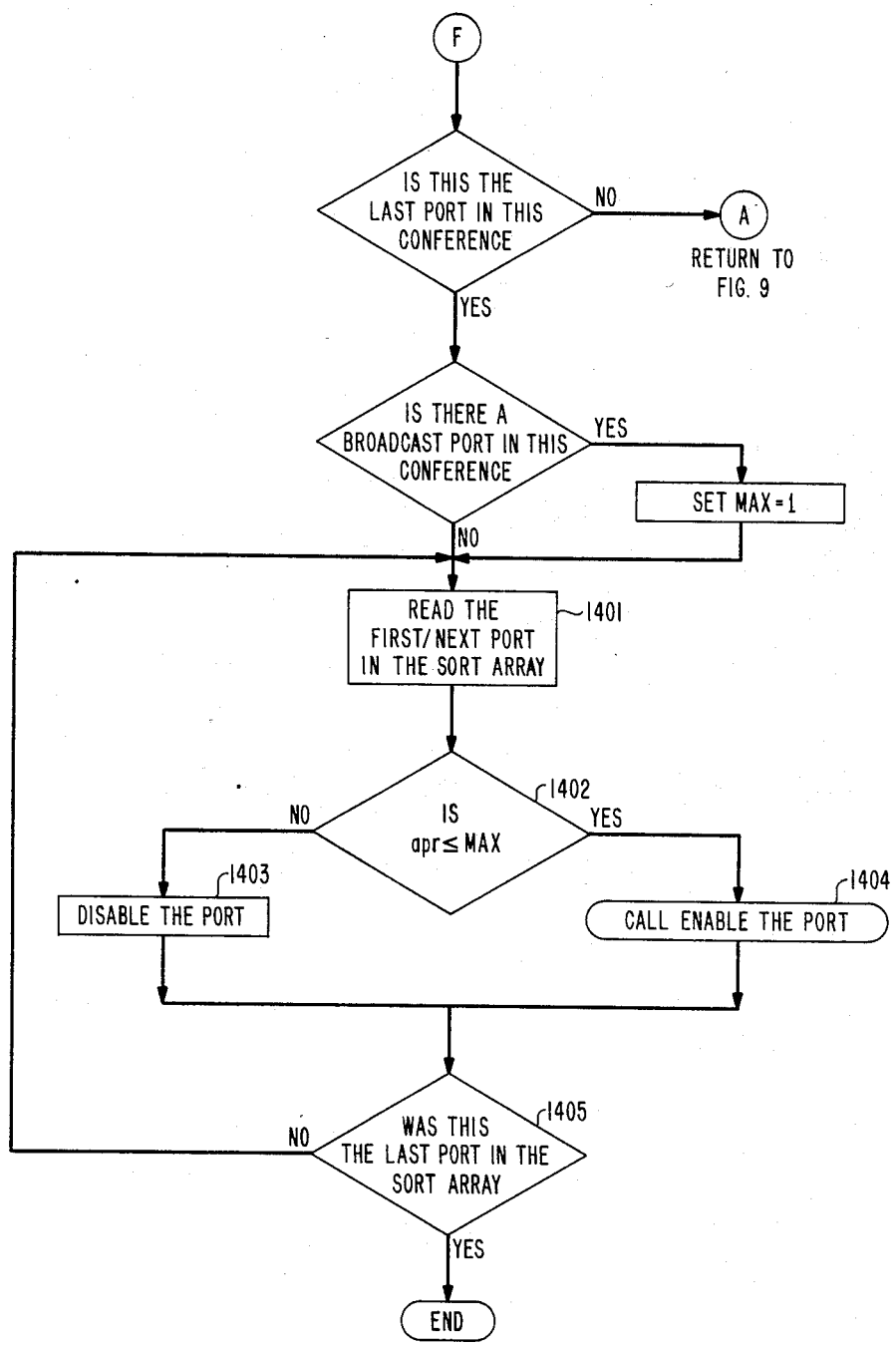

SORT ARRAY

| | | | |
|---|---|---|---|
| TOP | apl (1) | PORT # (1) | ⇒ apr = 1 |
| | apl (2) | PORT # (2) | ⇒ apr = 2 |
| | apl (3) | PORT # (3) | ⇒ apr = 3 |
| | apl (4) | PORT # (4) | ⇒ apr = 4 |
| BOTTOM | apl (5) | PORT # (5) | ⇒ apr = 5 |

*FIG. 17*

EXEMPLARY APL CONSTANTS

|SP/$\overline{SP}$|

| BC | AT | BA | EA | HB | HE | WI | | SPEECH LEVEL |
|---|---|---|---|---|---|---|---|---|

BITS 15 14 13 12 11 10 9 8 7 —————————— 0

*FIG. 15*

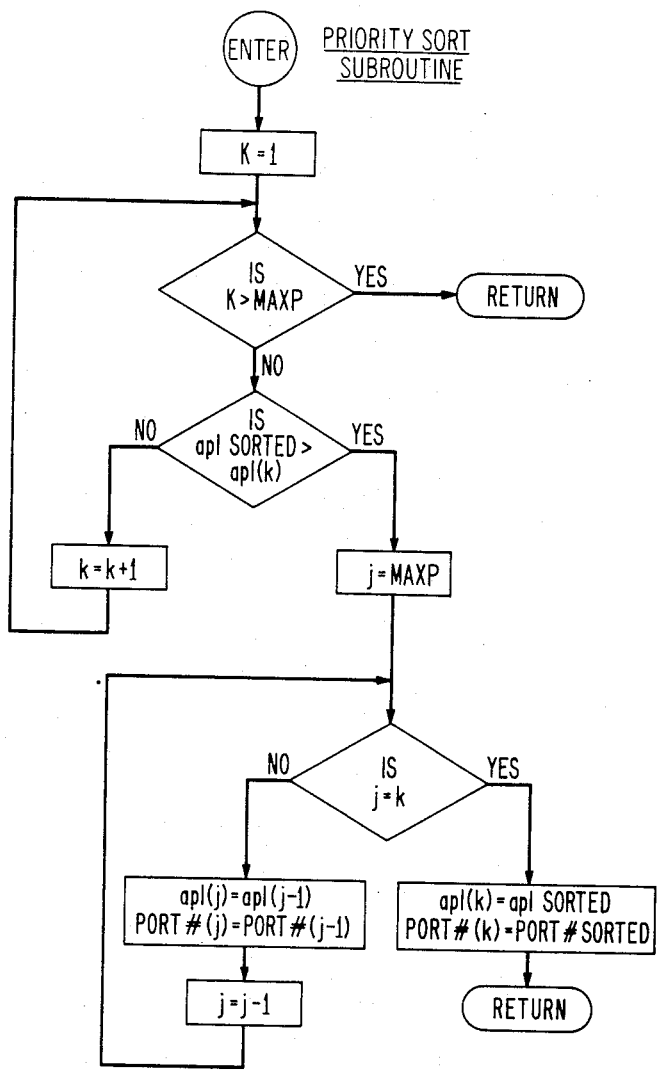

ENABLE THE PORT SUBROUTINE

ATTACK SUBROUTINE

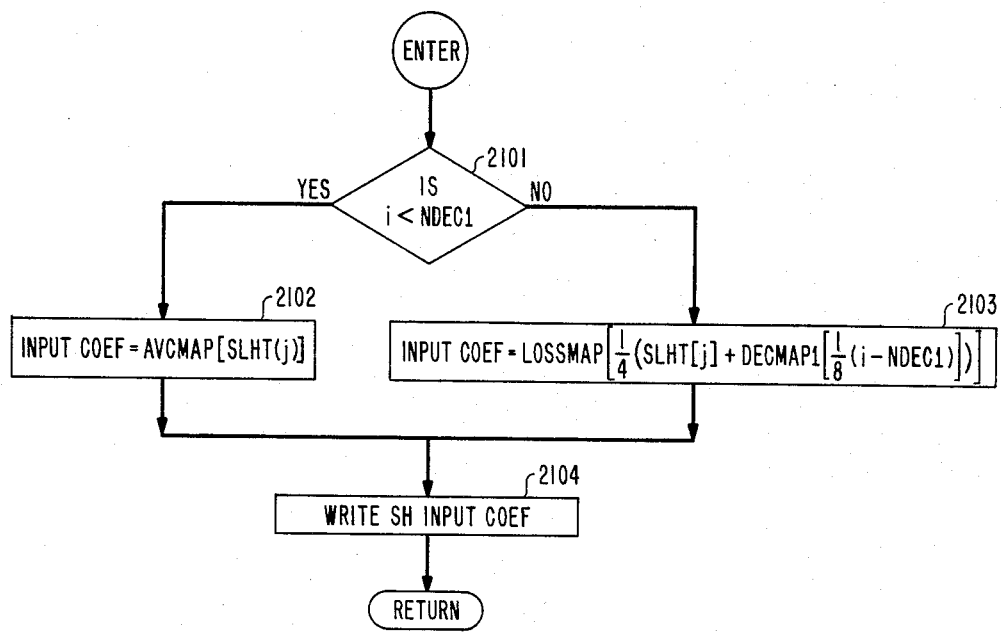
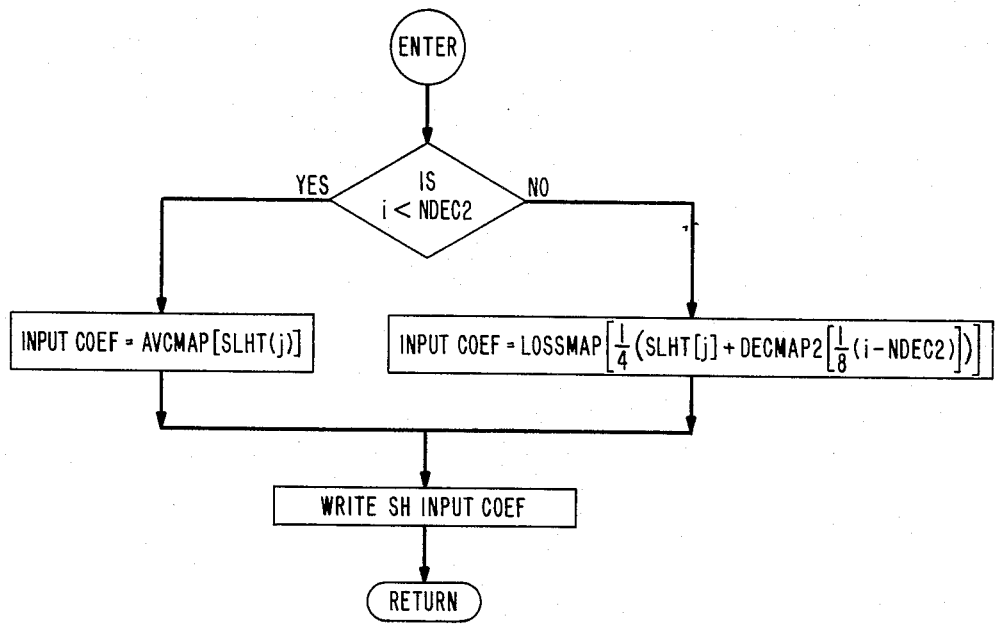

METHOD AND APPARATUS FOR CONTROLLING SIGNAL LEVEL IN A DIGITAL CONFERENCE ARRANGEMENT

CROSS-REFERENCE TO RELATED APPLICATIONS

This application is a continuation-in-part of M. A. Marout et al., entitled "Method and Apparatus for Controlling Ports in a Digital Conference Arrangement", U.S. Pat. No. 4,475,190, filed May 27, 1982, and is related to the applications of J. H. Bobsin et al., entitled "An Arrangement for Reduction Clipping in a Digital Conference Arrangement", U.S. Pat. No. 4,482,997, filed May 27, 1982; D. E. Herr et al. entitled "Automatic interactive Conference Arrangement", U.S. Pat. No. 4,475,189, filed May 27 1982; T. W. Anderson et al., entitled "Announcement System", U.S. Pat. No. 380,511, filed May 21, 1982; A. H. Bass et al., entitled "Method and Apparatus for Controlling Ports in a Digital Conference Arrangement", filed concurrently with this application; and M. A. Marout et al., entitled "Method and Apparatus for Improving the Quality of Communication in a Digital Conference Arrangement", filed concurrently with this application.

TECHNICAL FIELD

This invention relates generally to multiport digital conference arrangements and, more particularly, to method and apparatus for controlling the signal level represented by information samples from a port to improve the quality of communication.

BACKGROUND OF THE INVENTION

Generally, digital conference arrangements sum information samples representing, for example, the level of speech from each conferee and then distribute the resulting sample to each conference port. In a teleconference, the communication between conferees should sound like a typical two-party connection; however, this is usually not the case when the conferees communicate with each other over transmission facilities having different amounts of loss which introduce differences in speech levels heard by the conferees. These differences between speakers, referred to as contrast, can be quite annoying to the conferees.

One of the more common ways to minimize this contrast is to utilize a gain control or level adjustment circuit to compensate for transmission loss. One prior art arrangement involves one or more conferees transmitting a test signal to the conference circuit and then adjusting the gain of an amplifier connected to the conferee's port to compensate for that leg's transmission loss. Another prior art arrangement utilizes subscriber station transitions (on/off-hook) to adjust the signal level of conferee input samples. Both arrangements have disadvantages in that they only adjust the signal level of samples for variations in transmission facility losses. They do not dynamically adjust the signal level for speaker variations such as, for example, voice strength, distance from a microphone, etc. In addition, when speech level is used to establish priorities for the selection of simultaneous speakers, these speaker variations put a speaker with a soft voice or low volume at a disadvantage in the selection process.

Another problem with the prior art is a noticeable change in signal level which may be accompanied by an annoying "click" when a conference port is abruptly enabled and disabled from the conference arrangement.

SUMMARY OF THE INVENTION

The foregoing problems are solved and a technical advance is achieved in a multiport digital conference arrangement by method and apparatus for controlling the signal level represented by an information sample from a port to be includes in an output sample for distribution to the ports. The signal level from a port is controlled by forming a composite level from the signal levels represented by information samples received on a port, generating a coefficient in accordance with the composite level, and adjusting in accordance with the coefficient the level of an information sample from the port to be included in an output sample.

More specifically, in one illustrative embodiment of the invention, the composite level of speech on a selected port is compared with a reference level entry in a speech level history table. When the two levels are different, the reference level is adjusted by a predetermined amount to control the rate at which the port adapts to a new speech level. In any case, the reference level is then mapped to a port gain coefficient so that the speech level from loud speakers is attenuated and the speech level from soft speakers is amplified. In addition, the reference level is mapped in a particular way so that all speakers are heard as having essentially the same composite speech level.

In accordance with one feature of the invention, the signal level represented by information samples received on the ports may be adjusted to implement speaker selection.

In accordance with another feature, the coefficients for a port may be incrementally adjusted during a predetermined period of time to avoid abrupt, signal level changes when implementing speaker selection.

BRIEF DESCRIPTION OF THE DRAWING

The invention may be better understood from the following detailed description when read with reference to the drawing in which:

FIG. 7 shows a flow diagram of one base cycle of the audio bridge operational software;

FIG. 8 through 14 shows a detailed flow diagram of one base cycle of the conference processing program which implements the conference processing algorithm;

FIG. 15 shows the layout of a 16-bit word representing exemplary constants that may used to establish the adjusted priority level of a conference port;

FIG. 16 shows a detailed flow diagram of the priority SORT subroutine;

FIG. 17 shows the layout of the conference sort array used to enable ports on the bridge;

FIG. 21 shows a detailed flow diagram of the DECAY 1 subroutine which generates input coefficients to enable a port on the bridge in an incremently decreasing manner;

FIG. 22 shows a detailed flow diagram of the DECAY 2 subroutine which generates input coefficients to enable a port on the bridge in an incremently decreasing manner;

DETAILED DESCRIPTION

INTRODUCTION

Figure 1:
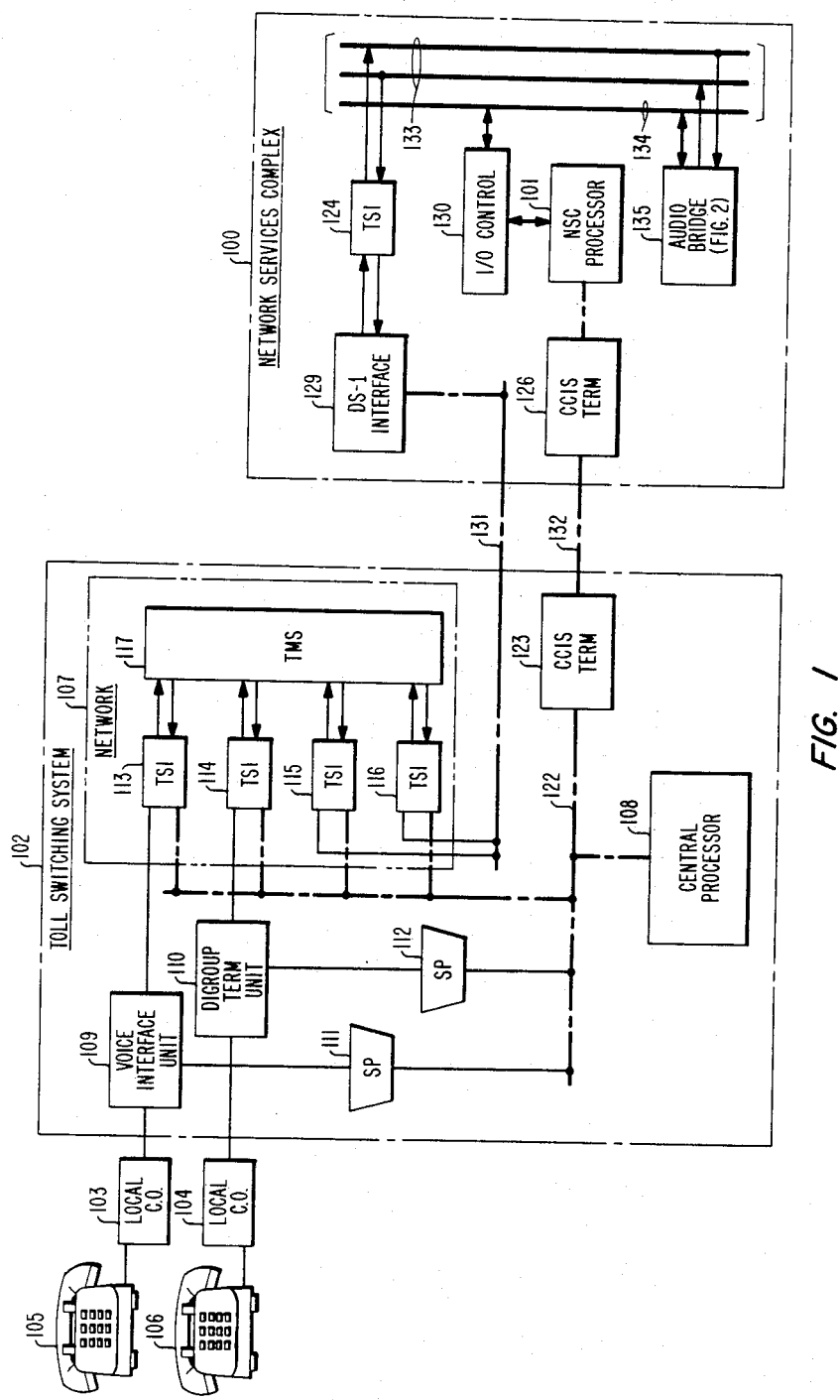
FIG. 1 shows a block diagram of a telephone network having a toll switching system equipped with a network services complex (NSC) for providing audio conferencing and other services.

The general organization of a system employing the invention is illustrated in the block diagram of FIG. 1 which shows a typical communications network having a toll switching system 102 which serves local central offices 103 and 104. Central offices 103 and 104 contain switching apparatus for providing communication services to customer stations 105 and 106, respectively. Connected to switching system 102 is network services complex 100 for providing special services such as audio and data conferencing.

Network services complex 100 includes NSC processor 101, audio bridge 135, and other units. As will be described in more detail below, one of the functions of the complex is to provide facilities for conferencing the voice signals of customers over the telephone network via the toll and local switching offices.

Toll switching system 102, as depicted in FIG. 1, is a typical electronic switching system, such as, the No. 4 ESS which is manufactured by the Western Electric Company, Incorporated. This switching system is described in detail in the The Bell System Technical Journal, Vol. 56, No. 7, Sept. 1977, and need not be fully described herein for the reader to understand the present invention.

TOLL SWITCHING SYSTEM

Switching system 102 comprises network 107, central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

Time multiplex switch 117 is a two-stage switch array comprised of solid state crosspoints which provide a multiplicity of unidirectional paths between its inputs and outputs. Each network connection through TMS 117 is made in terms of a pair of unidirectional paths in one of the 128 time slots sharing the paths on a repeating basis at an 8KHz rate. The switches are controlled by information contained in time slot memories and this information is placed in the memory by the central processor under the control of call processing programs.

Time slot interchange units 113–116 provide the initial time-space and final space-time stages of network 107. The units receive incoming pulse code modulated (PCM) samples over analog and digital facilities in well-known DS-120 format where 102, eight-bit PCM channels are time division multiplexed with eight maintenance channels to form a 128 time slot frame. The receiving portion of a TSI unit buffers the incoming links to allow synchronization of the data with network timing and performs the initial time-space switching before transmitting the data to the TMS. After passing through the TMS, the data is returned to the same TSI or another TSI where the final space-to-time conversion is performed. The TSI then reloads the data onto outgoing DS-120 links where it is transmitted to the appropriate analog or digital facility.

Access to switching network 107 is via serial PCM links each accommodating 120 voice channels. However, central offices 103 and 104 can be connected to toll switching system 102 via analog or digital transmission facilities. Thus, as seen in FIG. 1, local central office 104 is connected to the toll office over digital facilities which terminate in digroup terminal unit 110, whereas local office 103 is connected via analog trunks to voice interface unit 109. Digroup terminal 110 performs the time division multiplexing and demultiplexing between interoffice transmission facilities and network 107 and also processes control signals from signaling processor 112.

The analog trunks are terminated in a voice interface unit such as 109 whose principal function is analog-to-digital conversion (and vice-versa) plus formating digital data for the TSI units. Voice interface unit 109 communicates with the central processor via signal processor 111.

Signal processor 111 is a directed processor under the control of central processor 108 and provides the scan, distribute, and digit reception tasks for analog trunks. Signal processor 112 performs the equivalent tasks for the digital trunks except that instead of physical scan and distribution points, the supervisory states of each trunk are stored in a memory of the signal processor.

The majority of the logic, control, storage, and translation functions required for the operation of the toll switching system are performed by central processor 108. A typical central processor suitable for use in the illustrative toll switching system is described in the Bell System Technical Journal, Vol. 56, No. 2, Feb. 1977.

As mentioned above, interoffice signaling information is extracted from the transmission paths of analog and digital trunks by signal processors 111 and 112, respectively, and used by central processor 108 for call processing. However, the signaling for certain trunks may be transmitted between the offices over a common data link separate from the transmission paths using a common channel interoffice signaling (CCIS) system. A typical common channel interoffice signaling system is described in The Bell System Technical Journal, Vol. 57, No. 2, dated Feb. 1978, and is depicted in FIG. 1 by CCIS terminal blocks 123 and 126 and data link 132.

NETWORK SERVICES COMPLEX

Coupled to the toll switching system is network services complex 100 comprising NSC processor 101, time slot interchange unit 124, DS-1 interface 129, input/output control 130, and audio bridge 135. Network services complex 100 also includes other units such as a data conferencing facility, dual tone multifrequency receivers, and data storage which have not been shown to simplify the drawing and which need not be fully described herein for the reader to understand the present invention.

It is intended that network services complex 100 function with many different types of switching systems to provide several special services in addition to those mentioned above. As such, complex 100 has been designed to connect to a switching system via conventional interoffice trunks and a CCIS-like data link. Interoffice trunks 131 serving complex 100 are digital facilities, such as, for example, well-known T1 type, which are similar to the trunks between toll office 102 and local office 103 as described above, and data link 132 along with CCIS terminals 123 and 126 which are similar to those described in the 1978 Bell System Technical Journal cited above.

The network services complex is modularly designed to allow for various service units to be added. All units are interconnected over a time multiplex data bus 133 and a serial control bus 134. The control bus is used by NSC processor 101 via I/0 control 130 to communicate control, status, and error information to the various units in the complex. Input/output control is a typical direct memory access circuit, whereas data bus 133 consists of a transmit and a receive leg, each handling 256 time slots of time-multiplexed PCM data.

Interface 129 connects interoffice trunks 131 from toll switching system 102 to time slot interchange unit 124 which switches any of the 120 or 256 time slots on the interoffice trunks and data bus 133, respectively.

The network services complex 100 is controlled by NSC processor 101 which performs all call processing, maintenance, fault recovery, diagnostics and audits for the entire complex. NSC processor 101 also interfaces with CCIS terminal 126 to transmit and receive messages from the host toll switching system 102.

As mentioned above, the network services complex can be equipped to furnish many services. For this illustrative embodiment, the complex is equipped with an audio bridge 135 which will be used for establishing audio conference under customer control.

THE AUDIO BRIDGE

Figure 2:
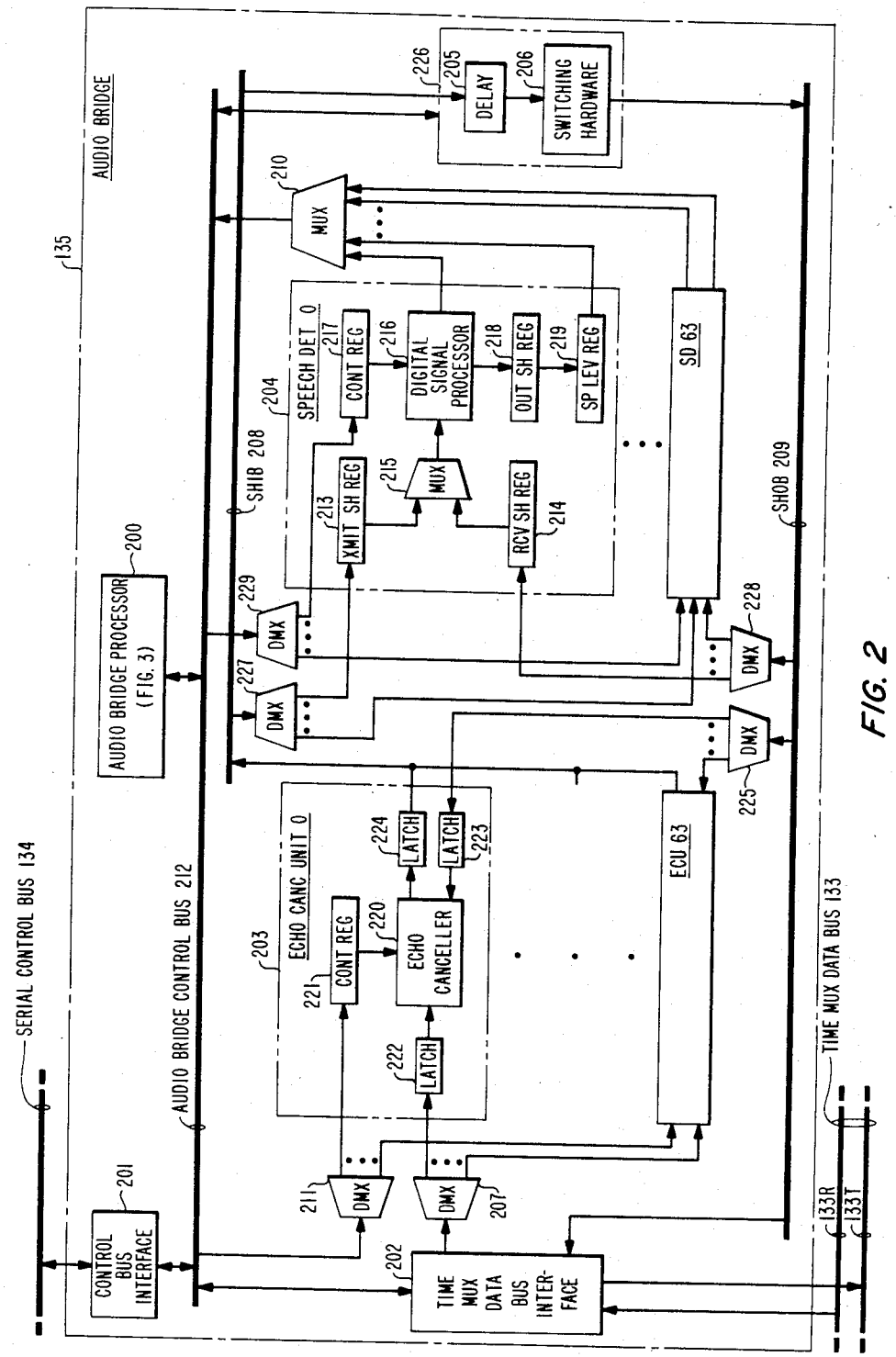
FIG. 2 shows a more detailed block diagram of the NSC audio bridge for providing audio conferences.

The audio bridge is a multiport digital conference arrangement and is illustrated in more detail in the block diagram of FIG. 2. The conference arrangement comprises an audio bridge processor 200, bus interfaces 201 and 202, a plurality of echo canceler units such as 203, a plurality of speech detectors such as 204, and logic unit 226 which includes delay unit 205 and switching hardware 206. A speech detector and an echo canceler are provided on a per-port basis to detect and measure the level of speech and to control the amount of echo, respectively. In this illustrative embodiment, 64 speech detectors and 64 echo cancelers have been provided to make up a 64 port (channel, time slot) audio bridge, but only 60 on an alternating basis will be available for conferencing, the others being used for spares and maintenance testing. Thus, the audio bridge can form conference varying in size from one 60-port conference to 20 three-port conferences.

Each port is monitored for the presence of speech above a threshold level, the instantaneous level of speech being represented by an information sample. The instantaneous levels of speech on a port are combined over a given time period to form a composite level for comparison with the threshold. Upon detecting speech, the speech detector for that port generates two control signals. One is a speech indication which designates the port as having speech thereon, and the other is a speech level estimate which is used for port selection and automatic level control. The audio bridge processor scans the speech detectors once each base cycle for these control signals to direct the switching hardware to include only information samples from selected, designated ports in the output sample. Generally, with one conferee speaking, only the input sample from that speaker is included in the output sample. With more than one conferee speaking simultaneously, the switching hardware sums the input sample from each speaker together to form the output sample. To allow sufficient time for speech detection and port selection, the delay unit stores all incoming information samples for a period of time equal to the worst case speech detection and channel selection time. During one portion of this time period, the two control signals are generated. During a subsequent portion, the delay unit applies the stored information samples to the switching hardware for selective inclusion in an output sample.

Communication within the audio bridge between the audio bridge processor and other units is via audio bridge control bus 212. The audio bridge communicates with the rest of the network services complex, and, therefore, the telephone network via serial control bus 134 and time multiplex data bus 133. It is over serial control bus 134 that the audio bridge receives orders from and sends replies to NSC processor 101 for establishing and controlling conferences. Time multiplex data bus 133, on the other hand, comprises a transmit and a receive leg for handling the samples of speech to be summed and distributed for each conference.

AUDIO BRIDGE PROCESSOR

Audio bridge processor 200 is a well-known 16 bit, bit-sliced microprogrammed controller that performs all common arithmetic, logic, and sequence control operations found in comparable 16 bit microcomputers. The audio bridge processor communicates with the NSC processor via audio bridge control bus 212 and is programmed to scan the transmit and receiver buffers within serial control bus interface 201 for orders to control the conferences and to format replies to the NSC processor.

The audio bridge processor also controls the status of the conferences by writing control information into the switching hardware control memory. In addition, the processor also scans the speech detectors to obtain information about the speech level of every port of the conference, maps the speech level into gain control coefficients, and then writes these coefficients into the switching hardware coefficient memory for noise and automatic level control. Furthermore, processor 200 controls the operation of the echo canceler hardware by writing control data into the echo canceler control registers.

Figure 3:
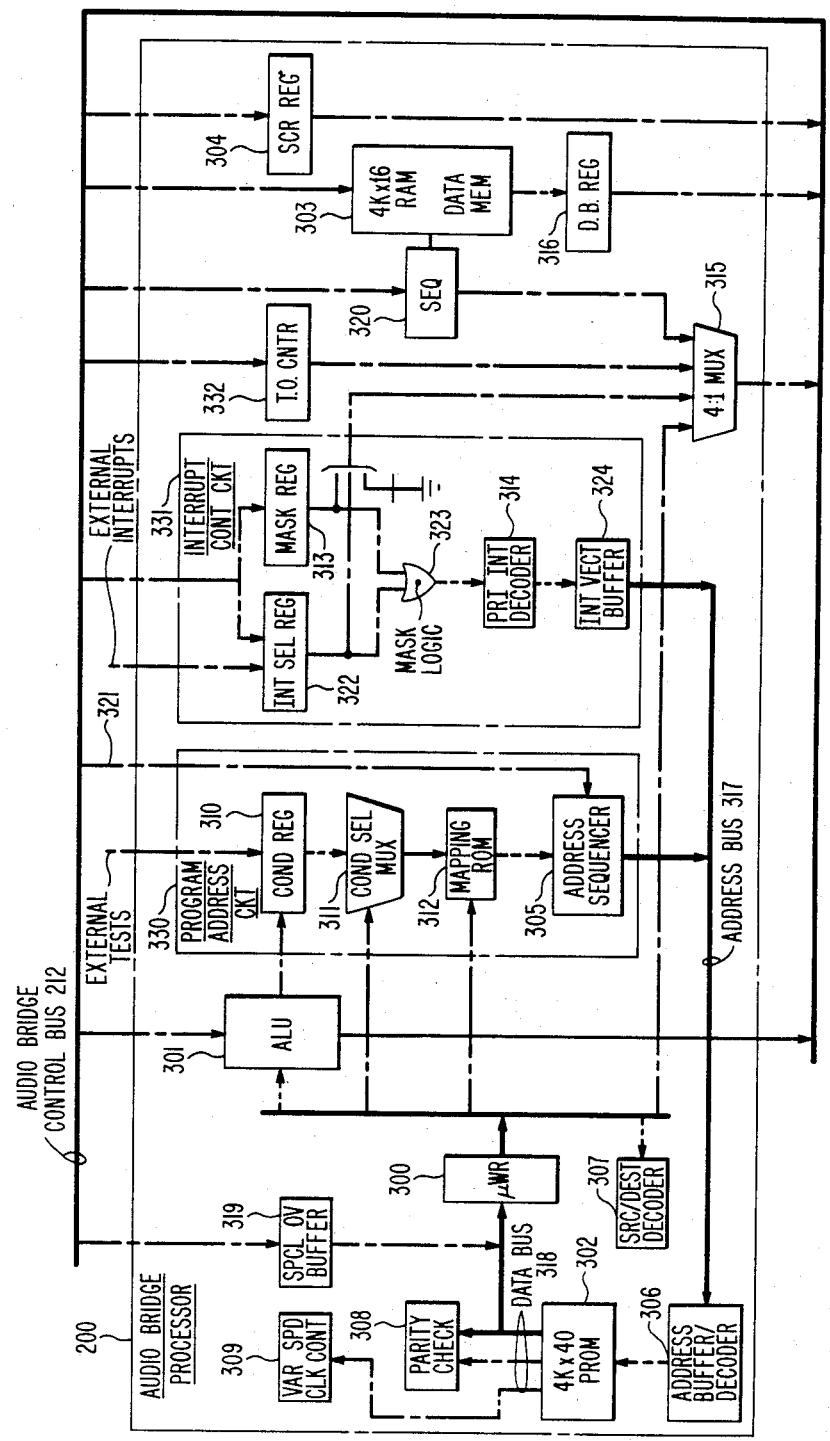
FIG. 3 shows a more detailed block diagram of the audio bridge processor for controlling the status of an audio conference.

Audio bridge processor 200 is disclosed in more detail in FIG. 3 and comprises a number of well-known processor and memory units which are commercially available. The basic units include microword data register 300, arithmetic logic unit 301, a program memory such as PROM 302, program address circuit 330, interrupt control circuit 331, and a data memory such as RAM 303. The audio bridge processor contains two internal buses, namely, address bus 317 and data bus 318. Access to the other units of the audio bridge, such as echo cancelers, speech detectors and the switching hardware, is via audio bridge control bus 212 which can also be used to transfer data to and from registers internal to the audio bridge processor.

The audio bridge is arranged so that various units within the bridge can act as sources and destinations for data on audio bridge control bus 212. Accordingly, each instruction specifies the source and destination address for data to be moved on the audio bridge control bus. Each address for program memory 302 is generated by program address circuit 330 and transmitted over internal address bus 317 to program memory 302 via address buffer/decoder 306.

Program address circuit 330 includes condition register 310, condition select multiplexer 311, mapping ROM 312, and address sequencer 305. The output of address sequencer 305 provides the address for program memory 302. In addition, the sequencer is directly connected to control bus 212 via conductors 321 to obtain addresses from any of the audio bridge registers that are acting as sources on the bus. Condition register 310 and multiplexer 311 are used to make conditional jumps which may be based on addresses applied to mapping ROM 312 from microword register 300.

Portions of the output of the program memory are then written into microword register 300, parity check circuit 308, and clock control circuit 309 via internal data bus 318. Microword data register 300 is a 32-bit latch that holds the instruction being executed. While the latched instruction is executed, a new instruction is fetched, thus permitting a pipelined architecture. Clock circuit 309 controls the number of clock cycles needed to execute the instruction by reading a field in the instruction. Parity of the instruction is calculated by parity check circuit 308. The instruction contained in microword data register 300 contains a source field, a destination field, and an overlay field. Interpretation of the overlay field depends on whether the instruction is for the arithmetic logic unit or the program address circuit. A special overlay buffer 319 is provided to allow words to be written into register 300 for diagnostic purposes.

The output of microword data register 300 is applied to arithmetic logic unit 301 and control bus source and destination register 307. Arithmetic logic unit 301 is capable of performing addition, subtraction, and other logical functions. Scratch-pad register 304 is also provided to conveniently move various types of data in arithmetic logic unit 301. Data bus source and destination register 307 decodes the source and destination address fields in the instruction to generate appropriate register input and output enable signals.

Data memory 303 in this embodiment is used as a temporary data store for the audio bridge processor and is controlled by sequencer 320 which permits the memory to act as both a data source and destination on control bus 212. To access the memory, address information from control bus 212 is first loaded into memory sequencer 320. Data from the memory is then placed on the control bus via data buffer register 316.

Interrupt control circuit 331 is also provided in the audio bridge processor. The interrupt control circuit comprises select register 322, mask register 313, mask logic 323, priority interrupt encoder 314, and interrupt vector buffer 324. In this illustrative embodiment, up to seven levels of external user-defined interrupts and seven software interrupts have been provided. When the interrupt circuit acts as a destination on control bus 212, a portion of the data is written into select register 322 and the remaining portion is written into mask register 313. The software interrupt can then be executed by masking the output of the select register with the output of the mask register. The masked output is then encoded by priority interrupt encoder 314 which drives buffer 324, whose output accesses program memory 302.

Time-out counter 332 is provided to function as a sanity timer which generates interrupts via interrupt select register 322. In addition, multiplexer 315 provides a one out of four source selection to reduce loading on control bus 212 and allows the data memory sequencer, time-out counter, interrupt control circuit, and microword register direct access to the bus.

ECHO CANCELER

Returning to FIG. 2, the echo canceler units are provided on a per-port basis as mentioned above. Each unit comprises an echo canceler such as 220, a plurality of latches 222–224 for gating speech samples into and out of the echo canceler, and a control register 221 under the control of audio bridge processor 200. An example of an echo canceler suitable for use in the echo canceler unit is described in "A Single-Chip VLSI Echo Canceler", Bell System Technical Journal, Vol. 59, No. 2, Feb. 1980, pp. 149–160.

During its assigned time slot, the echo canceler receives a near-end speech sample from time multiplex data bus interface 202 via demultiplexer 207 and latch 222 and a far-end speech sample from the switching hardware via demultiplexer 225 and latch 223 in $\mu$255 companded format. Echo canceler 220 computes the estimated echo and subtracts this from the near-end speech sample. The resultant is transmitted via latch 224 to switching hardware input bus 208. The speech samples from the switching hardware are transmitted to the time slot interchange unit via time multiplex data bus 122 and interface 202.

The transmit and receive legs of the time multiplexed data bus 133 pass 256 time slots of PCM audio data to and from time slot interchange unit 124. The audio bridge ports need only 64 time slots. The interface selects the 64 out of 256 time slots required for the audio bridge ports, formats the data, and generates timing signals for the echo cancelers, speech detectors, delay unit, and switching hardware.

SPEECH DETECTOR

Speech detector 204 comprises a digital signal processor 216, two input shift registers 213 and 214, an output shift register 218, and speech level register (latch) 219.

The speech detector does not modify the flow of data from the echo cancelers to the switching hardware but merely monitors the data flow on both the input and output sides, i.e., buses 208 and 209, of switching hardware 206 via demultiplexer 227 and 228. This gives the audio bridge processor full control over the gain or loss modification of the audio data and also permits the bridge to operate with some or all of the speech detectors out of service.

The digital signal processor 216 receives a synchronization pulse in the time slot to which the speech detector is assigned, and upon receiving the pulse, the speech detector starts alternately reading data from the switching hardware input and output buses 208 and 209 via shift registers 213 and 214, respectively, and multiplexer 215. In executing its program, the digital signal processor transmits a speech level measurement to output shift register 218 and latch 219. Periodically, the audio bridge processor scans the digital signal processor for a speech indication and, if present, reads the speech level measurement from the latch. This data is then transmitted over control bus 212 via multiplexer 210 which buffers data from all the speech detectors.

The audio bridge processor controls the digital signal processor via control demultiplexer 229 and register 217. By setting register 217, the digital signal processor can be put in any one of a number of operational or maintenance modes.

An example of a digital signal processor suitable for use in the present invention is disclosed in the Bell System Technical Journal, Vol. 60, No. 7, Part 2, September, 1981.

SWITCHING HARDWARE

Switching hardware 206 performs three major functions in the conference arrangement, namely, it sums the speech samples from the time slots (ports, channels) into their respective conferences to form an output sample for each conferee, implements noise and automatic level control on incoming speech samples, and implements echo control by inserting loss into the speaker's receive path when echo cancelers are not effective. The audio bridge processor controls these functions by writing the coefficient memory of the switching hardware with appropriate coefficients.

Insofar as the switching hardware is concerned, conference summation is a two-step process which occurs over two time frames, where a frame comprises a maximum of 64 audio bridge time slots. The mouth samples for a given time frame are first combined to form a sum for each conference. Then in the following time frame, an ear sample is produced for each conferee by subtracting the conferees mouth sample from the conference sum.

Figure 4:
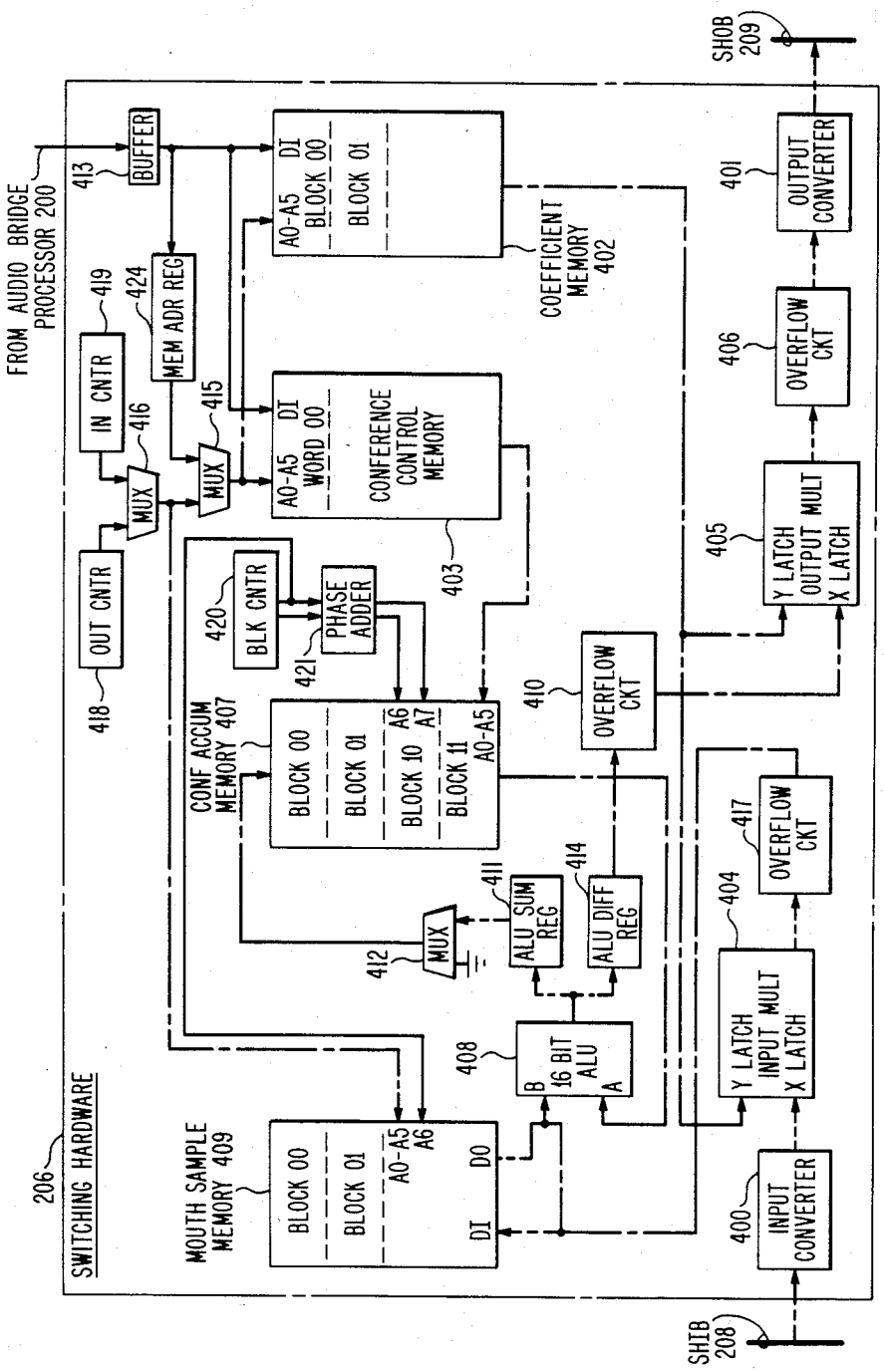
FIG. 4 shows a more detailed block diagram of the audio bridge switching hardware for including information samples from selected ports in an output sample.

The switching hardware used in this embodiment of the invention is shown in more detail in FIG. 4. The switching hardware receives the output of the echo cancelers via delay unit 205 over switching hardware input bus 208. Data is in the well-known $\mu$255, eight-bit Parallel format. This data is first converted to a 13-bit linear form by converter 400 using a table lookup operation, and the linear data is forwarded to input multiplier 404.

Input multiplier 404 implements the noise and automatic level control in the audio bridge. The two inputs to the multiplier are the linear mount sample from converter 400 and a coefficient from coefficient memory 402 as determined by audio bridge processor 200. The determination of the coefficient to be applied to the incoming sample will be described below. When the coefficient is equal to zero because there is no talking on a conferee port, the background noise related to that time slot is eliminated.

To insure that both the multiplier and, indirectly, the coefficient are valid, overflow circuit 417 checks for products larger than can be allowed in the bridge. If an overflow condition is detected, the output is forced to a maximum level corresponding to the sign-bit of the output.

The output of the overflow circuit 417 is then applied to addition and subtraction hardware to produce the conference sums for each frame and the individual ear samples for each conferee. The addition and subtraction is performed by arithmetic logic unit 408 in cooperation with memories 403, 407, and 409. When producing the total conference sum, arithmetic logic unit 408 adds an adjusted mouth sample from input multiplier 404 to the partial sum of the conference which is an accumulation of mouth samples from all time slots in the current time frame for the particular conference. The partial sum is stored in accumulator memory 407 via sum register 411 and multiplexer 412.

To produce an ear sample for each conferee, the conferee's mouth sample from the previous frame is taken from memory 409 and subtracted from the total sum of all mouth samples from the same frame of the conference.

The conference accumulator from an operational point of view, contains two blocks of stored data, namely, the partial sum of mouth samples of the current frame and the total sum of all mouth samples received during the previous frame.

During the summing process, one additional block is used for an initialization process, while still another block remains idle.

The addressing of coefficient memory 402, control memory 403, accumulator 407, and mouth sample memory 409 is controlled by time slot and frame counter circuits. The blocks of data associated with each time slot in the memories are addressed by input and output time slot counters 418 and 419 via multiplexer 416. Since mouth sample memory contains two 64-word data blocks, frame counter 420 is used to address the desired block of data. With accumulator 407, phase adder 421 in response to the frame counter addresses one of four data blocks.

As noted above, the audio bridge processor controls each conference as to its membership and the number and signal level of enabled simultaneous speakers. The processor exercises this control through the use of control memory 403 and coefficient memory 402.

Control memory 403 consists of sixty-four words, each of which, is associated with a conference port, i.e., a time slot. The control memory is written by audio bridge processor 200, via buffer 413, memory address register 424, and multiplexer 415. Each word in the control memory contains the address of the conference accumulator memory location to which a conference is associated. Thus, whenever a time slot sample is added to a partial sum or subtracted from a total sum, the sample in accumulator 407 is pointed to by control memory 403.

Coefficient memory 402 contains two 64-word data blocks, one word per time slot. One word corresponds to the input coefficient for adjusting the speaker's sample, and the other is for adjusting the listener's sample that is transmitted to a conferee.

The output of arithmetic logic unit 408 that is to be transmitted to a conferee is transmitted via difference register 414 and overflow circuit 410 to output multiplier 405. Multiplier 405 adjusts the ear sample by the coefficient factor received from memory 402 to provide additional echo control. Similar to the input operation, overflow circuit 406 makes sure that the output level of the ear sample does not exceed a certain threshold, and the resultant is converted back to $\mu 255$ format by output circuit 401. The companded signal is transmitted over switching hardware output bus 209 via interface 202 to data bus 133. It is via this data bus and the NSC time slot interchange unit that the summed speech samples are distributed over the communication network to the conferees.

DELAY UNIT

Returning again to FIG. 2, delay unit 205 stores the information samples from all 64 ports for a period of time before the samples are applied to switching hardware 206. This provides enough time for the speech detectors to designate channels having threshold samples thereon and the audio bridge processor to select designated channels. If the delay unit is not utilized, the information samples would be applied directly to the switching hardware, and the loss of samples, commonly called clipping, would likely occur. When the samples represent speech, this clipping may result in the loss of the initial syllable or even the entire first word of a new speaker. In order to minimize clipping, the delay time should be greater than the time required by the speech detector to detect the presence of speech and the audio bridge processor to select designated channels.

Figure 5:
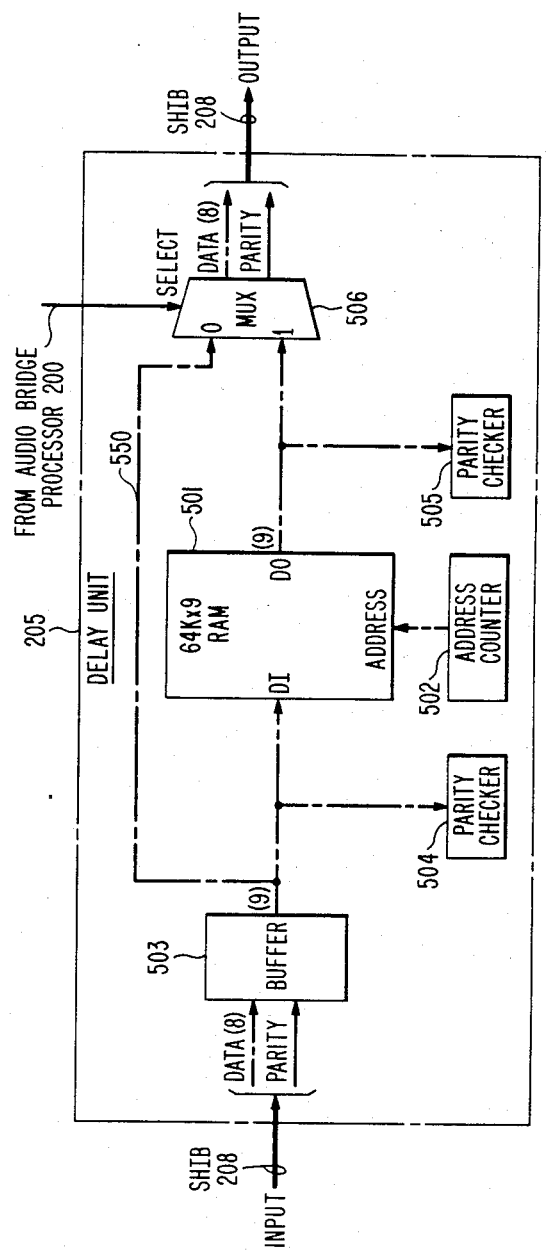
FIG. 5 shows a more detailed block diagram of the audio bridge delay unit for delaying the application of incoming information samples to the switching hardware.

The delay circuit used in this embodiment is depicted in more detail in FIG. 5 and basically comprises a delay memory such as RAM 501 and address counter 502. Delay memory 501 receives information samples from all 64 channels via switching hardware input bus 208 and input buffer 503. Each sample appears on the bus as eight parallel bits of PCM information during one time slot of a 64 time slot frame. In addition, a parity bit is provided with every input sample, and both are written into one location in delay memory 501 after parity is computed by input parity check circuit 504. During a subsequent time frame, the same sample and associated parity bit are read out during the same time slot the bits were written into memory. Parity is computed again for each sample by output parity circuit 505. During each of the 64 time slots, a read-write sequence is followed: reading old data out of a memory location, writing new data into the same location, and incrementing address counter 502.

One arrangement is to delay the sample a multiple of eight time frames where eight frames equals one millisecond of delay. Since there are 64 ports, it takes (8 times 64) 512 words of memory to delay a sample eight time frames. When, for example, the size of the delay memory is 64,024 words, the maximum delay is 127 milliseconds.

The length of delay can be controlled by adjusting the maximum value of the address counter. Since address counter 502 is incremented every time slot, the counter may be configured to cycle through 512 words of memory for one millisecond of delay. To provide k milliseconds of delay, the address counter is configured to cycle through k times 512 words of memory. If no delay is desired, a control signal from the audio bridge processor causes multiplexer 506 to select input samples directly from input buffer 503 via bypass bus 550.

To summarize, information samples from the channels are first stored in the delay memory during one time frame and then retrieved during a subsequent time frame for application to the switching hardware. This delay period allows the speech detectors and audio bridge processor sufficient time to detect the presence of speech and select designated ports from which the switching hardware will include input samples in an output sample. In one case, the input samples and the control signal are received by the switching hardware during the same time frame. Alternatively, the input samples may be delayed a longer period of time to permit the control signals to be first received by the switching hardware. This allows time for the switching hardware to adjust the selected ports before receiving the input samples to avoid clipping. Once samples are applied to the switching hardware, conference summation is then a two-step process which occurs over two time frames as previously described.

AUDIO DATA FLOW

Having described the bridge hardware, a brief description of the data flow through the bridge is in order. During each time frame, 64 time slots of PCM data representing, for example, speech enter the audio bridge via time multiplex data bus 133. Each time slot of data is first sent to an echo canceler such as 203 where various degrees of echo cancellation may be performed. Leaving the echo canceler unit, the data is sent to delay unit 205 where it is delayed for a period of time sufficient for a speech detector such as 204 to detect the presence of speech and audio bridge processor 200 to adjust the switching hardware to receive samples from selected ports. From the delay unit, the data is sent to the switching hardware where the incoming data is summed and distributed to each port of a conference.

A speech detector for each of the 64 ports (time slots, channels) monitors the data going into the delay unit and generates a speech/no-speech (busy/idle) indication and a speech level estimate. The speech level estimate or, more particularly, the peak energy level over a period of time on the port is represented as an eight-bit number in a speech level register such as latch 219, whereas the speech/no-speech indication is represented as a one-bit number generated by the digital signal processor. The audio bridge processor scans each speech detector every program base cycle to obtain the speech-/no-speech indication and the speech level estimate. These are then used by a conference processing program to select which ports of a conference are enabled on the bridge. The outer ports of a conference are disabled from the bridge so that speech from these ports is not heard by the other conferees.

CONFERENCE PROCESSING PROGRAM

The conference processing program is part of the audio bridge processor firmware and software that utilizes priority levels to determine which ports in a conference are enabled on the bridge. To ensure the stability of the bridge, only a limited number of simultaneous speakers will be heard by the conferees. Thus, the program must sometimes select which active ports will be enabled. That is, which ports with speech on them will be enabled on the bridge. A fundamental concern is that certain active ports should be enabled on the bridge easier than others. Appropriately, those ports should have a higher priority level than others. Hence, the priority level of each port is made a function of several pluralities or sets of states, such as, for example, the levels of speech on the port, the history of activity on the port as well as the period of time the port has remained in the present activity state, and an "assigned port priority". In addition, other sets of states devised by one skilled in the art may be used, such as the time of day, distance from the bridge, time zone, transmission facility type, etc.

Normally, the conferee who is presently speaking on an enabled port should have a higher priority level for staying enabled on the bridge than that of a conferee just beginning to talk. However, the conference processing program allows the speech level to adjust the priority level of active ports so that loud interrupting speakers may be heard on the bridge.

The history of activity on the port is also used to adjust the priority level. Thus, a different priority level constant is associated with each activity state. In addition, the state count—the number of program base cycles a port remains in a given activity state—is used to adjust the priority level of each port.

Another factor in adjusting the port priority level is the "port priority" assigned by the NSC processor. For example, when a port is added to a conference, the NSC processor sends a control signal to the audio bridge processor designating the port as having one of four port priorities: broadcast (BC), attendant (AT), normal (NORM), and listen-only (LO). The speech samples from a broadcast priority port are broadcasted to all other members of the conference. A port with attendant priority is always enabled on the bridge when the port is active—that is, when the conferee is speaking. This guarantees that speech from the attendant port will always be heard by the other conferees. If the number of attendant priority ports is greater than the maximum number of permitted simultaneous speakers, then only the attendant ports with the highest priority levels will be enabled. A port with normal priority receives no special treatment. When a normal priority port is active, it is enabled as long as the maximum number of simultaneous speakers is not exceeded. A port with listen-only priority is never enabled on the bridge. Thus, a listen-only port simply monitors the conference and cannot participate in the conversation.

Included in the conference processing program is an algorithm which keeps track of the present activity state, state count, and other variables of each port to establish priority levels. The program uses this algorithm once each program base cycle to update the activity state and priority level of each port.

Figure 6:
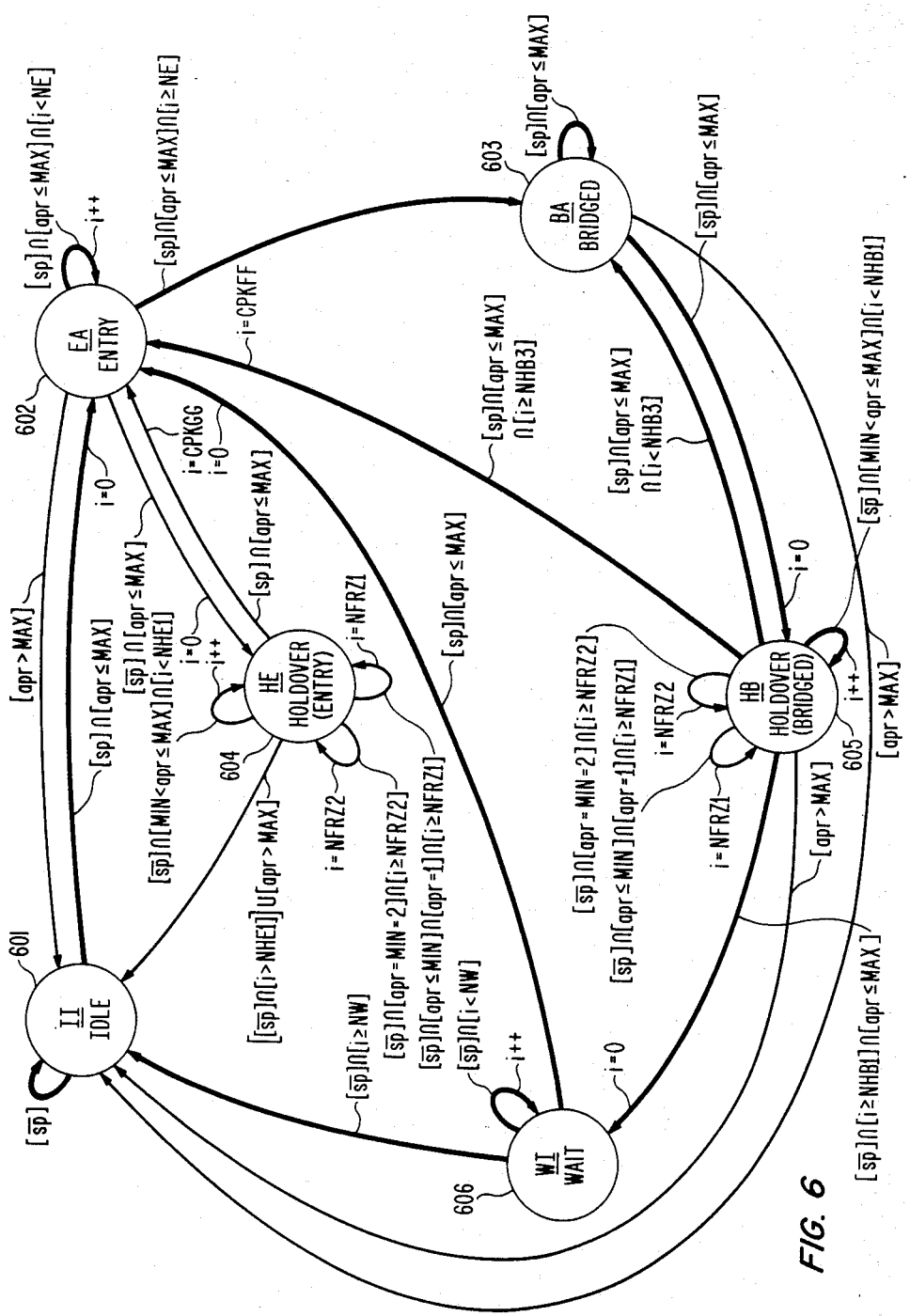
FIG. 6 shows a detailed state diagram of the conference processing algorithm for keeping track of the activity state of each port of a conference.
Figure 10:
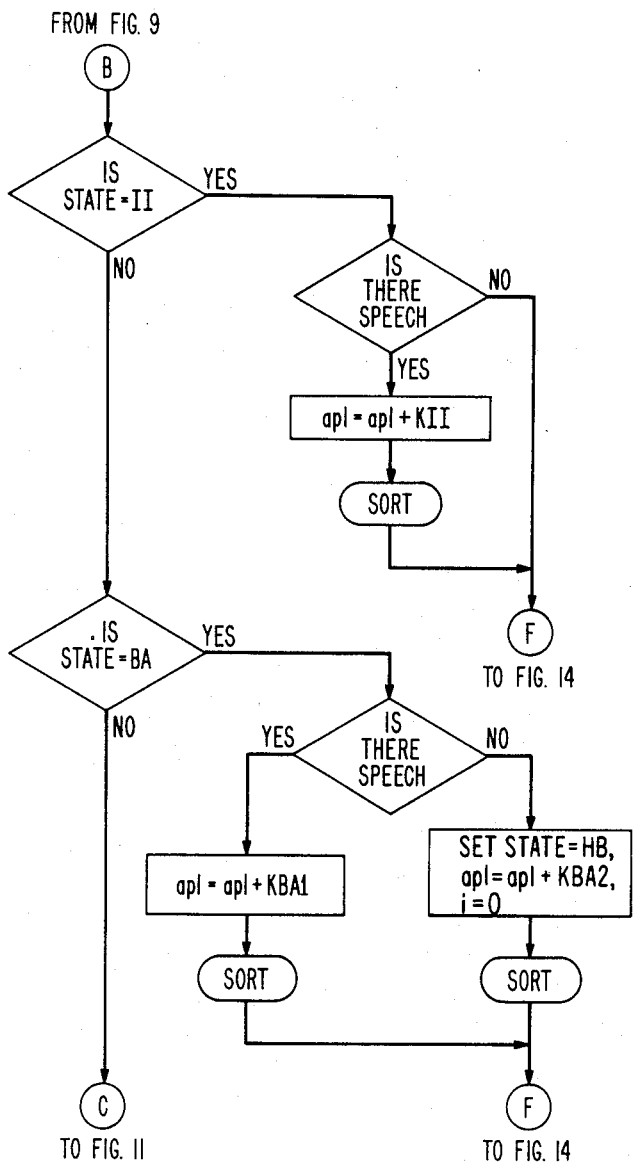
Figure 11:
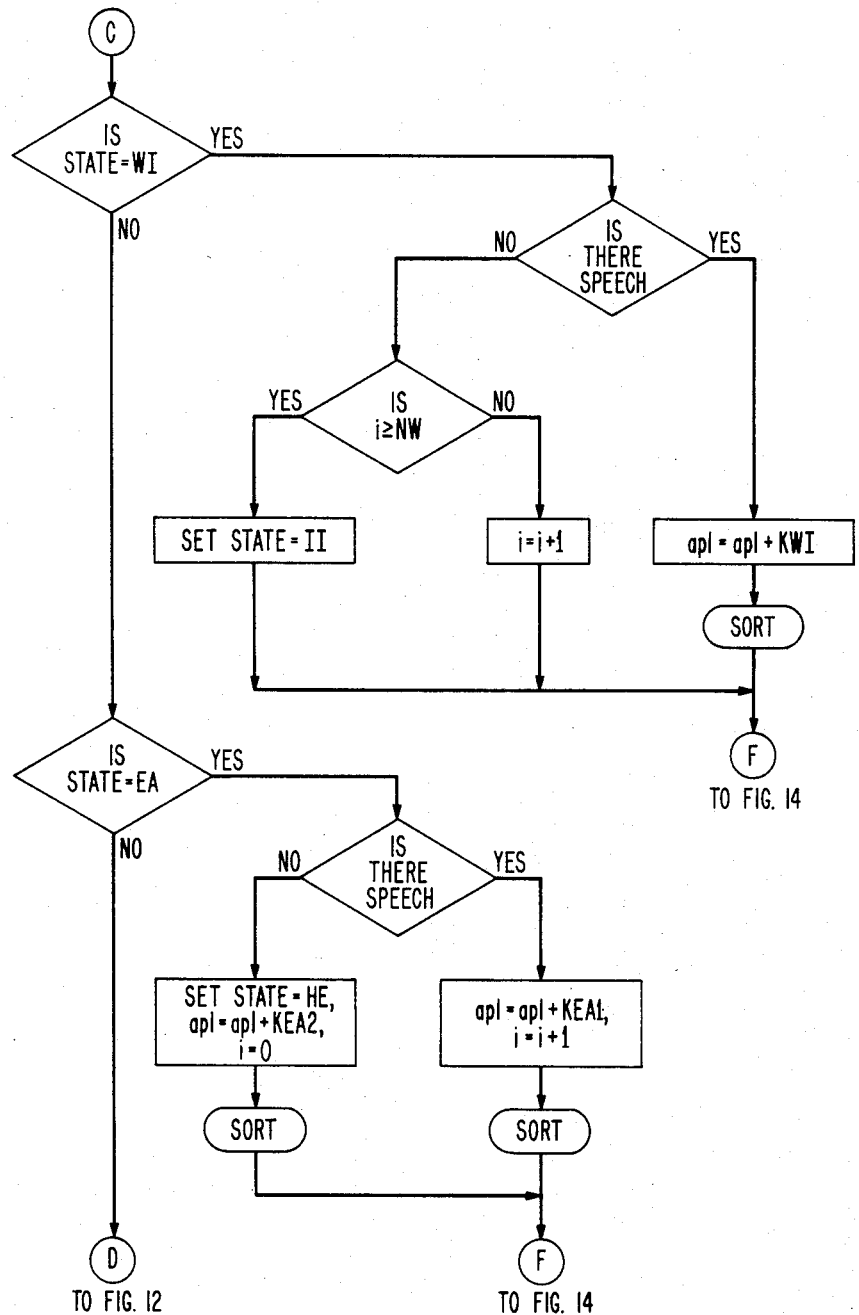
Figure 12:
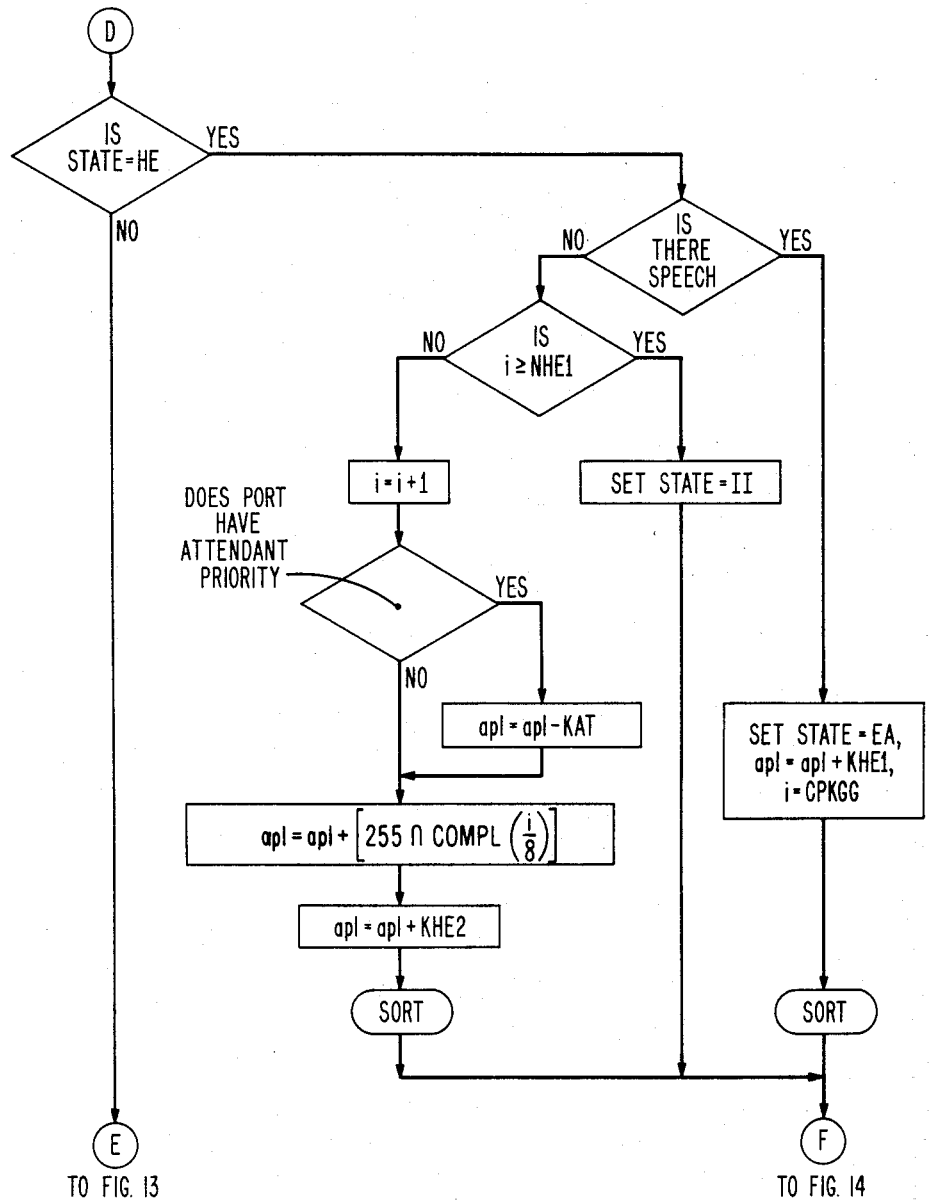
Figure 13:
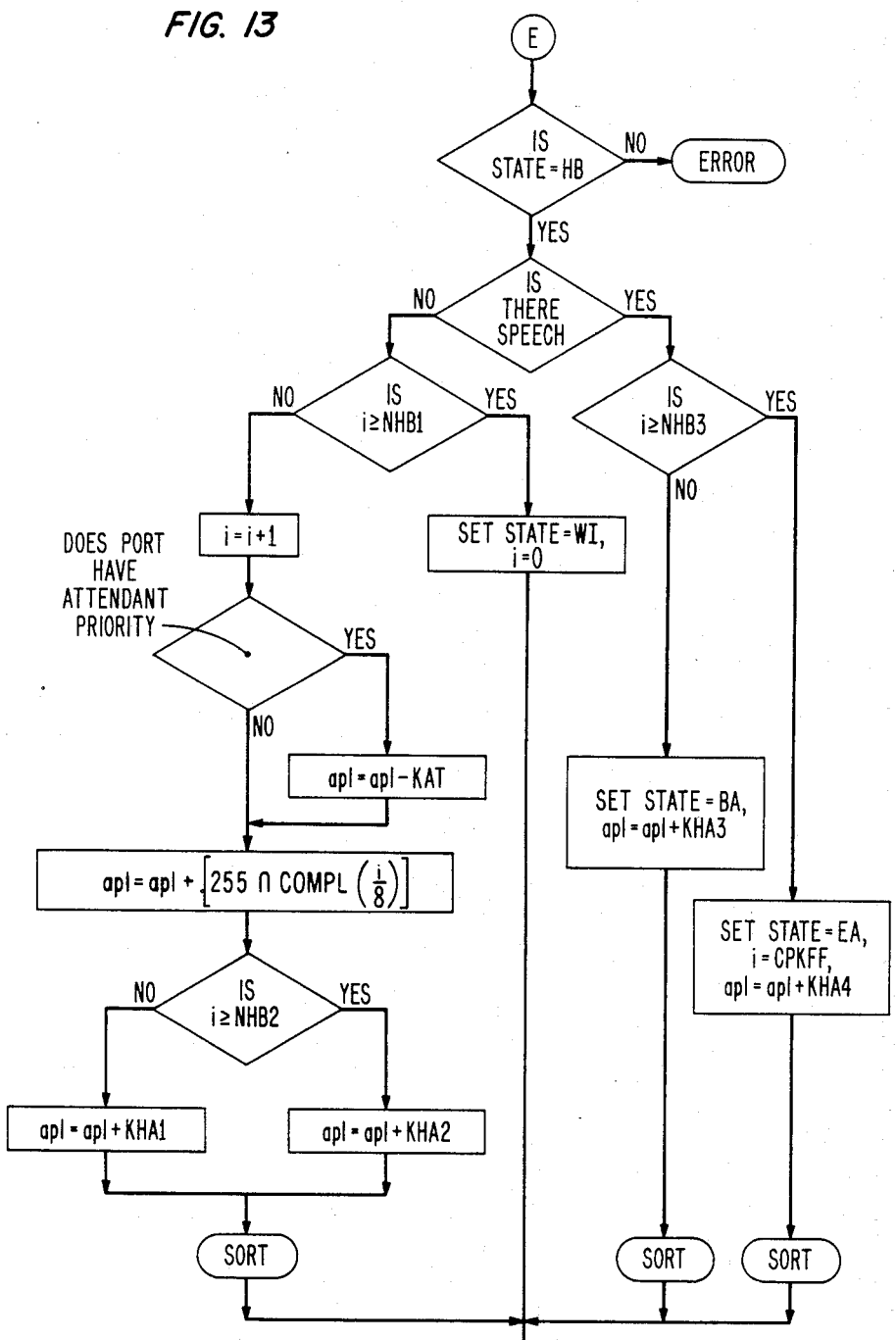

A detailed state diagram for the conference processing algorithm is depicted in FIG. 6. As shown, the diagram includes six activity states and all the possible state transitions. The bold transition paths represent the more common transitions made in normal program operation, whereas the lighter paths represent special cases. Inactive $(\overline{sp})$ ports are normally in "idle" (II) state 601 and disabled from the bridge. When a conferee starts talking, the active port assumes "entry" (EA) state 602 and is enabled on the bridge. In addition, the state count is initialized and subsequently incremented each base cycle to measure the time interval that speech samples are present on the port. If the conferee continues talking for a time interval called the entry period (NE) such as, for example, 500 milliseconds, the port assumes "bridged" (BA) state 603.

One feature of this invention is automatic level control which is performed during the latter portion of the entry period and in the bridged state to equalize the speech level of different conferees, thereby reducing speech level contrast. The speech detector for each port not only provides speech detection, but also forms a composite level of speech for the port. For each port every base cycle, the audio bridge processor reads the composite speech level, generates a coefficient which varies inversely with the composite speech level, and adjusts the speech level on each port in accordance with the coefficient for the port to equalize the speech level from different conferees. To control the rate at which the audio bridge processor adjusts to new speech levels, the processor first compares the composite speech level from the port with a reference level entry for the port in a speech level history table (SLHT), adjusts the reference level entry by a predetermined amount when the two levels are different, and using a table look-up operation maps the reference level entry to an input coefficient for the port which is then written into coefficient memory 402 of the switching hardware. These coefficients are then applied to input multiplier 404 to directly control the signal level of the linear mouth samples from the various ports. For example, when a coefficient (c) is set to zero, the signal level as well as all background noise on a port is greatly attenuated and, in effect, is excluded from the output signal which is distributed to the conferees. Thus, the automatic level control may be employed to effect speaker selection. When the input coefficient of a port is one, a unity gain situation exists. To equalize the levels of speech from different conferees, a low speech level is proportionately amplified when the coefficient is greater than one. That is, the lower the signal level, the larger the coefficient and the amount of amplification. Similarly, a high speech level is proportionately attenuated when the coefficient is less than one: the higher the signal level, the lower the coefficient and the greater amount of attenuation.

If a port becomes inactive in the entry state, it assumes "holdover entry" (HE) state 604 for a short holdover period (NHE1) such as, for example, 20 to 200 milliseconds and then placed back in the idle state. Hence, the short holdover period causes the amount of noise heard on the bridge to be reduced.

Similarly, if a port in the bridged state becomes inactive due to, for example, pauses between words, the port assumes "holdover bridged" (HB) state 605 with a long holdover period (NHBl)1such as, for example, 1.5 seconds. This reduces speech clipping caused by constantly enabling and disabling a port from the bridge. During this long holdover period, an active port may resume either the entry or the bridged state depending on how long the port has been in the holdover bridged state as shown in FIG. 6. If the port remains inactive during the entire holdover period, the port assumes "wait" (WI) state 606.

Wait state 606 is an intermediate state between the holdover bridged and idle states. When a port that was previously active leaves the holdover bridged state, the port is placed in the wait state rather than the idle state. Ports in the wait state are not enabled on the bridge. The only purpose of the wait state is to allow ports that have a recent history of speech, priority over ports that are in the idle state. A port will assume the idle state easier than others. Appropriately, those ports should have a higher priority level than others. Hence, the priority level of each port is made a function of several pluralities or sets of states, such as, for example, the levels of speech on the port, the history of activity on the port as well as the period of time the port has remained in the present activity state, and an "assigned port priority". In addition, other sets of states devised by one skilled in the art may be used, such as the time of day, distance from the bridge, time zone, transmission facility type, etc.

Normally, the conferee who is presently speaking on an enabled port should have a higher priority level for staying enabled on the bridge than that of a conferee just beginning to talk. However, the conference processing program allows the speech level to adjust the priority level of active ports so that loud interrupting speakers may be heard on the bridge.

The history of activity on the port is also used to adjust the priority level. Thus, a different priority level constant is associated with each activity state. In addition, the state count—the number of program base cycles a port remains in a given activity state—is used to adjust the priority level of each port.

Another factor in adjusting the port priority level is the "port priority" assigned by the NSC processor. For example, when a port is added to a conference, the NSC processor sends a control signal to the audio bridge processor designating the port as having one of four port priorities: broadcast (BC), attendant (AT), normal (NORM), and listen-only (LO). The speech samples from a broadcast priority port are broadcasted to all other members of the conference. A port with attendant priority is always enabled on the bridge when the port is active—that is, when the conferee is speaking. This guarantees that speech from the attendant port will always be heard by the other conferees. If the number of attendant priority ports is greater than the maximum number of permitted simultaneous speakers, then only the attendant ports with the highest priority levels will be enabled. A port with normal priority receives no special treatment. When a normal priority port is active, it is enabled as long as the maximum number of simultaneous speakers is not exceeded. A port with listen-only priority is never enabled on the bridge. Thus, a listen-only port simply monitors the conference and cannot participate in the conversation.

Included in the conference processing program is an algorithm which keeps track of the present activity state, state count, and other variables of each port to establish priority levels. The program uses this algorithm once each program base cycle to update the activity state and priority level of each port.

A detailed state diagram for the conference processing algorithm is depicted in FIG. 6. As shown, the diagram includes six activity states and all the possible state transitions. The bold transition paths represent the more common transitions made in normal program operation, whereas the lighter paths represent special cases. Inactive ($\overline{sp}$) ports are normally in "idle" (II) state 601 and disabled from the bridge. When a conferee starts talking, the active port assumes "entry" (EA) state 602 and is enabled on the bridge. In addition, the state count is initialized and subsequently incremented each base cycle to measure the time interval that speech samples are present on the port. If the conferee continues talking for a time interval called the entry period (NE) such as, for example, 500 milliseconds, the port assumes "bridged" (BA) state 603.

One feature of this invention is automatic level control which is performed during the latter portion of the entry period and in the bridged state to equalize the speech level of different conferees, thereby reducing speech level contrast. The speech detector for each port not only provides speech detection, but also forms a composite level of speech for the port. For each port every base cycle, the audio bridge processor reads the composite speech level, generates a coefficient which varies inversely with the composite speech level, and adjusts the speech level on each port in accordance with the coefficient for the port to equalize the speech level from different conferees. To control the rate at which the audio bridge processor adjusts to new speech levels, the processor first compares the composite speech level from the port with a reference level entry for the port in a speech level history table (SLHT), adjusts the reference level entry by a predetermined amount when the two levels are different, and using a table look-up operation maps the reference level entry to an input coefficient for the port which is then written into coefficient memory 402 of the switching hardware. These coefficients are then applied to input multiplier 404 to directly control the signal level of the linear mouth samples from the various ports. For example, when a coefficient (c) is set to zero, the signal level as well as all background noise on a port is greatly attenuated and, in effect, is excluded from the output signal which is distributed to the conferees. Thus, the automatic level control may be employed to effect speaker selection. When the input coefficient of a port is one, a unity gain situation exists. To equalize the levels of speech from different conferees, a low speech level is proportionately amplified when the coefficient is greater than one. That is, the lower the signal level, the larger the coefficient and the amount of amplification. Similarly, a high speech level is proportionately attenuated when the coefficient is less than one: the higher the signal level, the lower the coefficient and the greater amount of attenuation.

If a port becomes inactive in the entry state, it assumes "holdover entry" (HE) state 604 for a short holdover period (NHE1) such as, for example, 20 to 200 milliseconds and then placed back in the idle state. Hence, the short holdover period causes the amount of noise heard on the bridge to be reduced.

Similarly, if a port in the bridged state becomes inactive due to, for example, pauses between words, the port assumes "holdover bridged" (HB) state 605 with a long holdover period (NHBl)1such as, for example, 1.5 seconds. This reduces speech clipping caused by constantly enabling and disabling a port from the bridge. During this long holdover period, an active port may resume either the entry or the bridged state depending on how long the port has been in the holdover bridged state as shown in FIG. 6. If the port remains inactive during the entire holdover period, the port assumes "wait" (WI) state 606.

Wait state 606 is an intermediate state between the holdover bridged and idle states. When a port that was previously active leaves the holdover bridged state, the port is placed in the wait state rather than the idle state. Ports in the wait state are not enabled on the bridge. The only purpose of the wait state is to allow ports that have a recent history of speech, priority over ports that are in the idle state. A port will assume the idle state after a period called the wait period (NW), such as, for example, five seconds. It is thought that in most large conferences, only a few conferees do most of the talking. Therefore, in the event that many ports become active at the same time, the active ports in the wait state, rather than the idle state, may be considered the best ports to be enabled.

As mentioned, to ensure stability, the conference processing program limits the number of active ports (simultaneous speakers) enabled on the bridge. The maximum number of simultaneous speakers (MAX) is a parameter that may range, for example, from one to five. The larger the number, the more transparent the bridge is to the conferees, and the less chance of speech clipping. The disadvantage of a large number of simultaneous speakers is that as the number increases, the overall noise level on the bridge also increases. As shown in FIG. 6, the MAX parameter is used by the conference processing program to make state transitions.

In addition, the conference processing program always enables a minimum number of ports on the bridge. This minimum number (MIN) may vary, for example, from zero to two. When zero, no noise is heard on the bridge when all of the ports in a conference are inactive. This is annoying as the conferee has the feeling that he is cut off from the conference. When MIN equals one, the last port which was active is left in a holdover state until some port becomes active. Therefore, everyone hears noise from the active port except the conferee on the active port, who hears nothing. When MIN equals two, the last two active ports are left in the holdover states where all conferees hear some noise. An advantage for having a large number for MIN is that the last active ports are often the most probable ports to be active again. Hence, there is less chance of speech clipping. However, the disadvantage is that the total amount of noise always heard on the bridge is greater.

During each base cycle of the program, the state of each port is updated. Shown in FIG. 6, next to the state transition paths, is a set of conditions which cause a transition. In some cases, the transition is from one state to another. In others, the port remains in the same state as indicated by the transitions paths looping back on the same state. The variable "i" on the transition paths represents the state count of a port which is either incremented (++) or set to a designated constant and is stored in a 64-word block of data memory 303. As mentioned, the conference processing program utilizes the state count to measure the time interval that a port remains in a given activity state, as well as the time that speech is present on the port in that activity state. The variables "sp" and "$\overline{sp}$" represent the presence and absence of speech on the port, respectively, as indicated by the speech detector and are stored in the speech level table stored in data memory 303. The "adjusted priority rank" is represented by the variable "apr" and will be discussed later. By way of example, a transition from the idle to the entry state occurs when there is speech on the port and the adjusted priority rank of the port is less than or equal to the maximum number of permitted simultaneous speakers. This transition also causes the state count to be initialized or set to zero.

SOFTWARE IMPLEMENTATION

The program implements the state diagram depicted in FIG. 6 by assigning each port an "adjusted priority level" (apl). The larger the adjusted priority level, the higher the port priority and the more likely the port is to be enabled on the bridge. The adjusted priority level is the sum total of the priority constants attributed to the present activity state of the port including the speech-/no-speech indication, the assigned port priority, and the speech level estimate. Ports in a conference with the largest adjusted priority levels are enabled on the bridge. In this embodiment, the five ports in a conference with the largest adjusted priority levels are assigned an "adjusted prioroty rank" of one through five. The highest priority port has an adjusted priority rank of one, the second highest priority port having an adjusted priority rank of two, etc. If a conference has a port with broadcast priority, the broadcast port will typically have an adjusted priority rank of one. The adjusted priority rank is shown in the state diagram of FIG. 6 as the variable "apr".

CONFERENCE PROCESSING PROGRAM OPERATION

The conference processing program is part of the operational software in the audio bridge processor which is shown in FIG. 7. This operational software may take, for example, two to three milliseconds to complete one base cycle which includes time for communicating with the NSC processor and performing internal jobs such as hardware exercise, error checks, audits, etc.

As mentioned, the conference processing program implements the conference processing algorithm by assigning an adjusted priority level to each port. One base cycle of the conference processing program is depicted in the flow diagrams of FIG. 8 through 14. In block 801 of FIG. 8, the speech level estimate and speech/no-speech indication from each port are read by the audio bridge processor and then written into a speech level table in data memory 303. In blocks 802 and 803, each conference on the audio bridge is then processed independently and sequentially.

As indicated in block 901 of FIG. 9, conference processing begins by determining the first port number in a linked list stored in data memory 303. An adjusted priority level (apl) is then obtained for the port in the following manner: first, an eight-bit word representing the composite speech level estimate (measurement) is read from the speech level table and placed in a general register of arithmetic logic unit 301. This 16-bit general register contains the adjusted priority level of the port during processing. The layout of a 16-bit word representing exemplary priority constants that may be used to establish the adjusted priority level of a port is shown in FIG. 15. The activity state of the port and the assigned port priority are read out of two 64-word tables in data memory 303. In blocks 902 through 906, each port is then assigned an adjusted priority level which is a function of the speech level on the port and a port priority constant. For listen-only ports, the adjusted priority level along with the speech/no-speech indication are set to zero.

In FIGS. 10 through 13, additional constants are added to the adjusted priority level of a port depending on the present activity state (blocks 1001, 1002, 1101, 1102, 1201, and 1301), the speech/no-speech indication (blocks 1003, 1004, 1103, 1104, 1202, and 1302), and the state count (blocks 1105, 1203, and 1303–1305) of the port. It is during this sequence of steps that a predetermined combination of states is given its relative priority or rank with respect to any other combination of activity states, speech levels, and assigned port priorities. Also, the activity state and state-count are updated for those indicated cases. After these processing steps, the adjusted priority level of the port is equal to the sum total of the speech level, the activity state/state-count constant, and the assigned priority constant.

Finally, unless the port is inactive and either in the idle or wait state, a priority sort subroutine is called which is depicted in the flow diagram of FIG. 16. The priority sort subroutine is a well-known sort by insertion sorting routine that inserts the adjusted priority level and the port number of a port in a conference sort array such that the port with the largest adjusted priority level is at the top of the sort array, and the port with the smallest adjusted priority level is at the bottom. Note that the minimum number of ports that may be sorted in each conference is the minimum number of ports always enabled on the bridge (MIN). The maximum number of ports that may be sorted is the actual number of ports (MAXP) in the conference. The conference sort array is depicted in FIG. 17 and is stored in data memory 303 of the audio bridge processor.

After all the ports in a particular conference have been sorted, the ports in the sort array with the highest adjusted priority rank are enabled on the bridge as shown in FIG. 14. The remaining ports in a conference are disabled such that the speech level from any of these ports is greatly attenuated and, in effect, excluded from any speech signal which is distributed to the conferees. As depicted in blocks 1401 through 1405, the initial/next port is first read out of the sort array. If the adjusted priority rank of the port is equal to or less than the maximum number of simultaneous speakers to be heard by the other conferees, the port is enabled on the bridge (subroutine 1404), otherwise the port is disabled (block 1403). A check (block 1405) is then made to determine whether there are any additional ports in the sort array. If so, the next port is read out of the sort array, and the enable process (blocks 1401–1405) is repeated.

Figure 18:
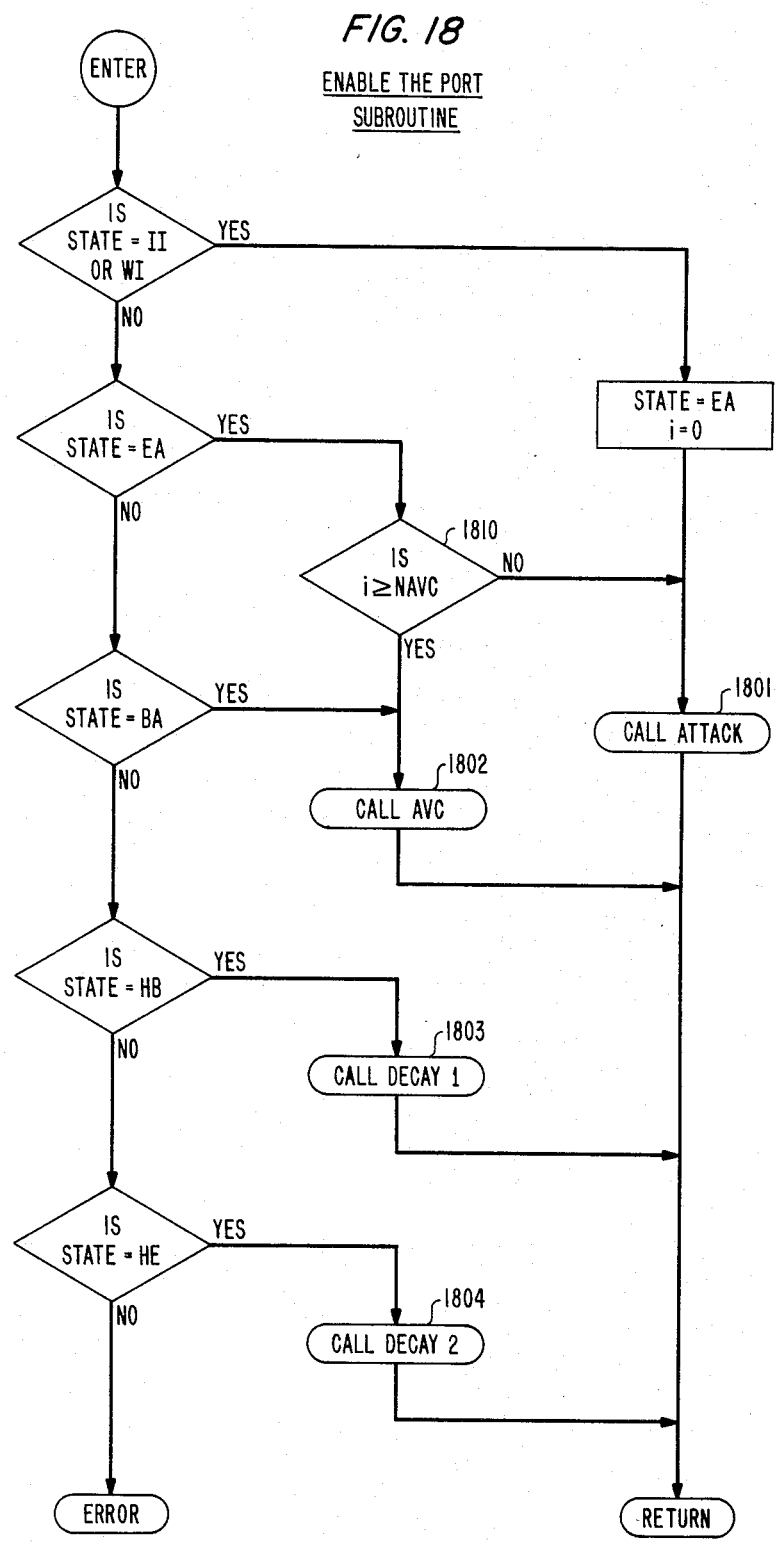
FIG. 18 shows a detailed flow diagram of the ENABLE THE PORT subroutine which generates the input coefficients for the switching hardware to enable a port on the bridge.

During the port enable process performed by the ENABLE THE PORT subroutine which is depicted in FIG. 18, any one of four automatic gain control subroutines ATTACK, AVC, DECAY 1, and DECAY 2 (1801-1804) may be utilized by the conference processing program to write input coefficients which are used to enable the port on the bridge. To illustrate this function and the interrelationship of the various gain control subroutines, a description will now be given of a port in the entry state (EA) transcending into the bridged state (BA) and finally going into one of the holdover states (HB and HE). When the port initially assumes entry state EA and the state count is less than state count constant NRMP, the ATTACK subroutine (1801) is called to write an incrementally increasing function of input coefficients during a predetermined time period defined by the state count constant NRMP. Input multiplier 404 then uses these coefficients to enable the port on the bridge in a gradual manner without an abrupt and noticeable change in background noise.

Figure 20:
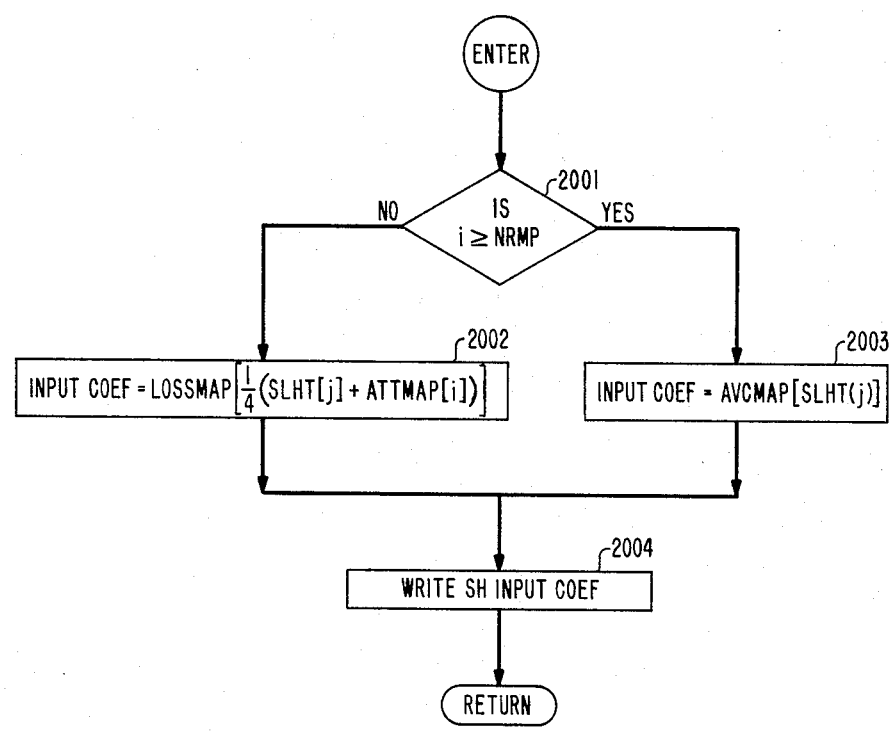
FIG. 20 shows a detailed flow diagram of the ATTACK subroutine which generates input coefficients to enable a port on the bridge in an incremently increasing manner.
Figure 23:
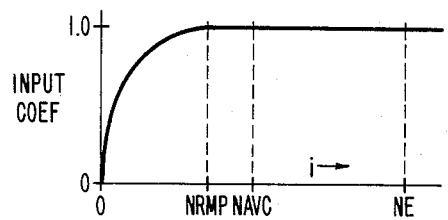
FIG. 23 is an illustrative diagram of input coefficients, plotted with respect to state count, as generated by the ATTACK subroutine.

Depicted in FIG. 20 is a detailed flow diagram of the ATTACK subroutine for port number "j" (j being a variable). Normally, the input coefficient of a port entering the entry state has been set to zero to effectively exclude the information samples from the port from any output samples, thereby preventing background noise from the port from being heard by the other conferees. As mentioned, to enable the port on the bridge without an abrupt change in signal level, the input coefficient is incrementally increased each base cycle until, for example, a unity gain condition is reached. By way of example, this incremental increase is graphically depicted in FIG. 23 which illustrates the input coefficient as a function of state count, i being the number of completed base cycles. The state count constant NRMP represents the number of base cycles needed to complete the incremental increase, whereas the state count constant NAVC represents the number of completed base cycles in the entry period NE before automatic level control is performed. As shown in blocks 2001 through 2003 of FIG. 20, the state count is first compared with state count constant NRMP. If the state count is less than NRMP, the input coefficient is increased as shown in block 2002. This increase is a function of the SLHT(j) entry in speech level history table SLHT for the port and the ATTMAP(i) entry in the ATTMAP table for the state count both mapped by the LOSSMAP table. When the state count is greater than NRMP, the SLHT(j) entry from the previous base cycle is again mapped to the same input coefficient as shown in block 2003. Finally, in block 2004, the input coefficient is written into the switching hardware (SH) coefficient memory.

Figure 25:
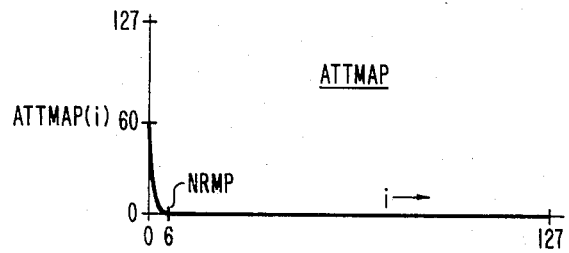
FIGS. 25 through 29 show graphical representations of illustrative entries of the ATTMAP, LOSSMAP, AVCMAP, DECMAP1, and DECMAP2 tables.

The ATTACK subroutine uses two mapping tables (ATTMAP and LOSSMAP) as well as speech level history table SLHT to generate an incrementally increasing function of input coefficients during a NRMP state count period. Entered by the port number (j), speech level history table SLHT contains a speech level entry SLHT(j) for each port of a conference. Each of the speech level entries includes a seven-bit integer ranging from 0 through 127 and a 16-bit fraction. The ATTMAP table maps the state count (i)—the number of program base cycles of a port in the entry state—to a number ATTMAP(i), both ranging from 0 to 127. The ATTMAP(i) number in combination with the integer portion of the SLHT(j) entry form an index to enter the LOSSMAP table as shown in block 2002 of FIG. 20. A graphical representation of an illustrative relationship between state count i and ATTMAP(i) entries of the ATTMAP table is shown in FIG. 25. As illustrated between state counts 0–6, ATTMAP(i) decreases from 60 to 0 and remains at 0 through state count 127.

The LOSSMAP table maps the index (m) formed from the speech level history and ATTMAP table entries to an input coefficient which during a NRMP state count period increases in a gradual manner. Applying these coefficients to the input multiplier causes the gain of the multiplier to increase, for example, from −30 dB up to a maximum of +10 dB depending on the SLHT(j) entry. As shown in block 2002 of FIG. 20, the index (m) is generated by adding the ATTMAP(i) entry from the ATTMAP table to the integer portion of the SLHT(j) entry from the history table for the port. In this illustrative embodiment, the sum which can range between 0 and 254 is further divided by 4 to enter the LOSSMAP table which has only 64 entries numbered from 0 to 63.

Figures 26, 27:
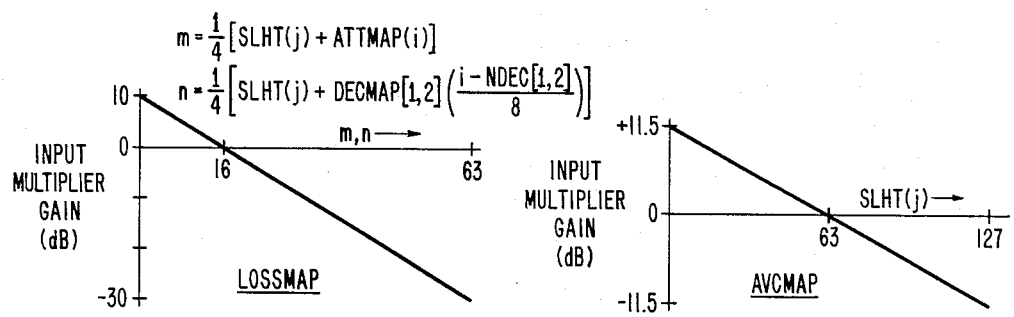

Since the ATTMAP(i) entry decreases in value with respect to time, i.e., base cycles 0–6, the index m also decreases while the SLHT(j) entry remains constant. As a result, the input coefficient as well as the input multiplier gain of a port increase in an inverse manner with respect to index m. This increase gradually increases the volume of a new speaker without an abrupt and noticeable change in signal level. A graphical representation of an illustrative relationship between index m and input multiplier gain in decibels (dB) of the LOSSMAP table is shown in FIG. 26.

Between state count constants NRMP and NAVC, the input coefficient for the port remains constant as the SLHT(j) entry continues to remain constant during this period. However, the same SLHT(j) entry is inversely mapped to an input coefficient each base cycle by the AVCMAP table as shown in block 2003 of FIG. 20. A graphical representation of an illustration relationship between SLHT(j) entries and input multiplier gain of the AVCMAP table is shown in FIG. 27. As illustrated, a SLHT(j) entry of 63 results in 0 dB of multiplier gain and, thus, no amplification of the speech signal. As the speech level increases, the increasing SLHT(j) entry is inversely mapped by the AVCMAP to a decreasing input coefficient which when applied to the multiplier increasingly attenuates the signal. Similarly, as the speech level decreases, the decreasing SLHT(j) entry is inversely mapped to an increasing input coefficient which when applied to the multiplier increasingly amplifies the signal.

Returning the reader's attention to the ENABLE THE PORT subroutine, after NAVC state counts have elapsed in the entry (EA) state (block 1810) or when the port is in the bridged (BA) state, the AVD subroutine (1802) is called to adjust the input coefficient (c) of the port so that the composite speech level of the conferee is normalized and therefore, substantially equal to that of all the others. Thus, a speaker with a soft voice or positioned a distance from a microphone is heard by the other conferees as having essentially the same speech level as any other speaker.

Figure 19:
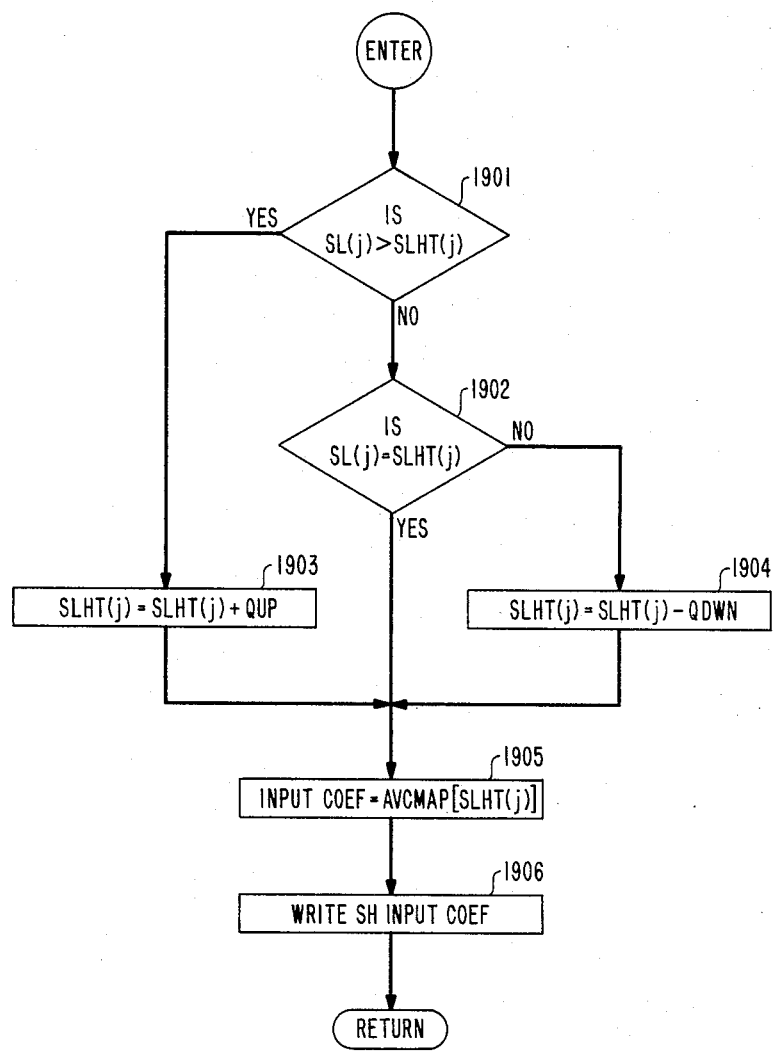
FIG. 19 shows a detailed flow diagram of the AVC subroutine which generates input coefficients to implement automatic level control on a port.

Depicted in FIG. 19 is a detailed flow diagram of the AVC subroutine to implement automatic volume control for each port. In blocks 1901 through 1904, the detected speech level (SL) from the port is compared with the speech level entry SLHT(j) in the speech level history table for that port. When the speech level on the port is the same level as that stored in the history table, the speech level history table entry as well as the input coefficient for that port remains the same. When the speech level on the port and the history table entry are different, the fraction portion of the history table entry is increased or decreased by the constants QUP and QDWN, respectively, to control the rate at which the history table adjusts to a new speech level. Since the AVCMAP table only maps the integer portion of the SLHT(j) entry, these constants must accumulate over a period of time to change the integer portion of the SLHT(j) entry. As a result, these constants cause the conference processing program to adjust to a speech level that continues to change over a period of time, but control the rate of adjustment so as not to be effected by occasional speaker inflections. Thus, when there is a change in speech level on a port, the entry in the history table is adjusted to reflect a new speech level such that the product of the magnitude of the new speech level and input coefficient approximates a constant. Instead of adjusting the level to reflect the full magnitude of the change, the constants QUP and QDWN are used over several base cycles to incrementally adjust the entry in the speech level history table to cause a gradual change in the speech level approaching that of the new level.

In block 1905, the AVCMAP table maps the speech level history table entry to an input coefficient for the port, which is then written in the switching hardware coefficient memory as shown in block 1906. It can be seen from the AVCMAP table graphically illustrated in FIG. 27 that the SLHT(j) entry in the speech level history table for each port is mapped to an input multiplier gain ranging, for example, between $-11.5$ and $+11.5$ dB. Accordingly, ports having an entry representing a low magnitude of speech are afforded a gain while a loss is inserted for ports having a high magnitude of speech. The overall effect is to substantially equalize the volume among the ports on the bridge, and reduce the annoying speech level contrast between loud and soft speakers.

When the port is in the holdover bridged (HB) or holdover entry (HE) states, the ENABLE THE PORT subroutine calls the DECAY1 and DECAY2 subroutines to disable a port from the bridge in a incrementally decreasing manner starting at state count NDEC1 and NDEC2, respectively. A detailed flow diagram of the DECAY1 and DECAY2 subroutines are depicted in FIGS. 21 and 22, respectively. The DECAY1 subroutine utilizes one rate of decay starting at state count NDEC1 for the holdover bridged state having a NHB1 state count holdover period, whereas the DECAY2 subroutine utilizes another rate of decay starting at state count NDEC2 for the holdover entry state having a NHE1 state count holdover period. By way of example, this gradual decrease of input coefficients as a function of state count is graphically illustrated in FIG. 24 for the two DECAY subroutines.

As mentioned, a port enters the holdover bridged or holdover entry state because speech is no longer detected on the port. To eliminate the background noise heard from the enabled port, the DECAY1 or DECAY2 subroutines incrementally decrease the input coefficients for the port during a predetermined decay period starting at state count NDEC1 and NDEC2, respectively. Thus, the port is kept enabled on the bridge for some initial period in the anticipation of continued speech after which the port is disabled in a gradual manner to eliminate background noise without an abrupt and noticeable change in signal level.

As shown in block 2101 of FIG. 21, when the port assumes the holdover bridged state, the state count is compared each cycle with state count NDEC1. Before state count NDEC1, the SLHT(j) entry for the port is mapped by the AVCMAP table to an input coefficient and written into the switching hardware as shown in blocks 2102 and 2104. As with the ATTACK subroutine, since the SLHT(j) entry is not adjusted each base cycle in the holdover bridged state, the input coefficient remains constant during the NDEC1 state count period. When the state count reaches NDEC1, the input coefficient is incrementally decreased to zero during a predetermined state count period to effectively exclude background noise from the output sample distributed to the conferees. As depicted in block 2103, this incremental decrease of coefficients is a function of the speech level entry SLHT(j) in the speech level history table for port number j and the state count (i) mapped by the DECMAP1 table which together form an index (n). In turn, this index (n) is mapped by the LOSSMAP table to an input coefficient.

Figure 24:
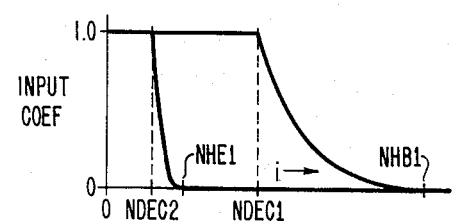
FIG. 24 is an illustrative diagram of input coefficients, plotted with respect to state count, as generated by the DECAY 1 or DECAY 2 subroutine.
Figure 28:
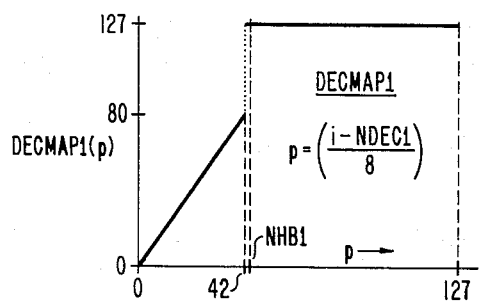

A graphical representation of illustrative DECMAP1 table entries which maps a quantity p to a DECMAP1(p) number is shown in FIG. 28. The quantity p represents an interval of time computed by subtracting the state count constant NDEC1 from the state count (i) of the port in the holdover bridged state and dividing by eight. The difference is divided by eight to reduce required memory space for the DECMAP1 table. Hence, one table entry will be used for eight state counts. Such as seen in FIG. 28 as time (p) increases from 0 to 42, the DECMAP1(p) entry linearly increases from 0 to 80. When p reaches 42 just before the end of the holdover entry period NHB1, DECMAP1(p) abruptly changes to and remains at 127. The LOSSMAP table then inversely maps the index (n) from the speech level history and the DECMAP1 tables to an input coefficient which exponentially decreases during a predetermined period between state count constants NDEC1 and NHBI as shown in FIG. 24.

Figure 29:
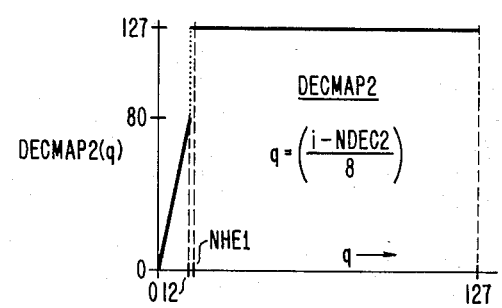

When the port is in the holdover entry state, the DECAY2 subroutine is called to similarly decrease the input coefficients starting at state count NDEC2, however, with a different rate of decay defined by the DECMAP2 table. A detailed flow diagram of the DECAY2 subroutine, which is similar to the DECAY1 subroutine, is depicted in FIG. 22. In addition, a graphical representation of illustrative DECMAP2 tables entires is shown in FIG. 29, time being represented by q. By way of example, attention is again directed to FIG. 24 which graphically illustrates the gradual decrease in input coefficients with respect to state count in the holdover bridged and holdover entry states.

During this end of conference processing, the number of simultaneous speakers heard on the bridge is limited to the value of MAX. Depending on the value of MIN, some number of ports are always enabled on the bridge. If one of these ports is in a holdover state, the state count for that port is written to a specific constant so that the state count does not increment. Thereafter, the port will stay in the holdover state until some other port becomes active. Then normal incrementing of the state count will cause the port to go either to the idle or wait state. After this conference has been processed, the conference processing program will continue to process any other conferences during each base cycle.

In summary, the conference processing program rank orders the adjusted priority level of each port to determine which conference ports are enabled on the bridge. To ensure the stability of the bridge, only a limited number of simultaneous speakers are heard by the conferees. The priority level of each port is a function of several pluralities or sets of states, such as, for example, the levels of speech on the port, the history of activity on the port as well as the number of base cycles the port has remained in the present activity, and an assigned port priority. As suggested, two or more other sets of states devised by one skilled in the art may be used.

In this illustrative embodiment, the presence and levels of speech are determined by a speech detector for each port. The conference processing program then uses the presence of speech to update the present activity or "activity state" of each port, each activity state being assigned a different priority level. In addition, the state count—the number of program base cycles a port remains in a given activity state—is used to adjust the port priority level. Another factor in adjusting the port priority level is the port priority constant assigned by the NSC processor. All of these weighted factors are then combined to form an overall priority level for each port. One set of port priority constants assigned to each state was shown in FIG. 15. After the conference processing program determines the overall priority level for each port, the levels are sorted to establish a rank order. The ports with the highest rank order are then enabled on the bridge for that base cycle. Of course, some other rank order, such as the lowest or another devised by one skilled in the art, may be used depending on the assigned priority constants.

In accordance with one feature of this invention, automatic level control is performed on each port in the entry and bridged states to equalize speech level between ports and thereby reduce speech level contrast. This is accomplished by the AVC subroutine which is called by the conference processing program to compare the composite speech level formed by the speech detector for the port with a reference level stored in the speech level history table. The table entry is then increased or decreased by one of two different constants to control the rate by which the bridge adjusts to a new speech level. The speech level history table entry is then mapped to an input coefficient which is written into the switching hardware coefficient memory. As a result, a high level composite speech signal on a port is attenuated, whereas a low level composite speech signal is amplified. Since the mapping function is the same for each port, the conferees hear speech from the different ports at substantially the same level with little speech contrast between speakers.

In accordance with another feature of this invention, one of three other automatic gain control functions may be performed dependent on the state of the port while being enabled on the bridge. To eliminate a noticeable change in signal level when enabling and disabling a port, the volume of speech may be increased in a gradual manner when the port is in the idle, wait, or holdover entry states or decreased in a gradual manner when the port is in the holdover bridged or holdover entry states. Here again, a subroutine in the conference processing program maps the speech level history table entry for each port into incrementally increasing or decreasing input coefficients over several base cycles using two mapping tables. Each base cycle, the input coefficient of each port is then written into the switching hardware coefficient memory to implement signal level adjustment.

In accordance with still another feature of this invention, the above features may be utilized to effect speaker selection in a digital conference arrangement. The ports of speakers selected to be heard on the bridge are enabled on the bridge using the four aforementioned automatic gain control functions. Whereas, the gain coefficient of ports having unselected speakers is set to zero. As a result, the information samples from these ports are, in effect, excluded from the output sample that is distributed to the conferees.

It is to be understood that the above-described method and apparatus is merely an illustrative embodiment of the principles of this invention and that numerous other methods and arrangements may be devised by those skilled in the art without departing from the spirit and scope of the invention. In particular, one skilled in the art may easily assign different constants to change the rate at which the switching hardware adjusts to speech level changes or to change the rate the attack and decay ramps incrementally increase and decrease.

What is claimed is:

1. In a digital conference arrangement having a plurality of ports for receiving information samples each representing the level of a signal, a method for controlling the signal level represented by an information sample to be included in an output sample for distribution to the ports; comprising the steps of:

forming a composite level from the signal levels represented by information samples received on a port, generating a coefficient in accordance with said composite level, adjusting in accordance with said coefficient the signal level represented by an information sample from the port to be included in an output sample.

2. The method set forth in claim 1 wherein said step of generating a coefficient includes the steps of comparing said composite level with a reference level, adjusting said reference level by a predetermined amount when said composite and reference levels are different, and mapping said reference level to said coefficient.

3. The method set forth in claim 2 wherein said step of adjusting said reference level includes the steps of increasing said reference level by a first predetermined amount when said composite level is greater than said reference level and decreasing said reference level by a second predetermined amount when said composite level is less than said reference level.

4. The method set forth in claim 1 or 3 wherein said method further comprises the step of repetitively performing the prior steps during each one of plurality of time intervals.

5. In a digital conference arrangement adapted to include in an output sample an information sample from each selected port of a plurality of ports, each sample representing the level of a signal, a method for selecting ports, comprising the steps of:

forming a composite level for each port from the signal levels represented by information samples received on the port;

detecting the state of each port in a plurality of states;

assigning a priority level to each port based on the composite level for the port and on the detected state of the port; and controlling the signal level represented by an information sample from each port to include in an output sample an information sample from a port having any of a plurality of predetermined priority levels.

6. The method set forth in claim 5 wherein said step for controlling comprises the steps of adjusting the signal level represented by an information sample from a port having any of said predetermined priority levels for inclusion in an output sample and setting the signal level represented by an information sample from any other port to a predetermined signal level for exclusion from the output sample.

7. The method set forth in claim 6 wherein said step for adjusting the signal level includes the steps of generating a coefficient for a port having any of said predetermined priority levels in accordance with the composite level for the port and adjusting in accordance with the coefficient for the port the signal level represented by an information sample from the port to be included in the output sample.

8. The method set forth in claim 7 wherein said generating step includes the step of incrementally increasing during a first time period the coefficients of a port having any of said predetermined priority levels when the port assumes a first state in said plurality of states.

9. The method set forth in claim 8 wherein said generating step also includes the step of incrementally decreasing during a second time period the coefficients of a port having any of said predetermined priority levels when the port assumes a second state in said plurality of states.

10. The method set forth in claim 9 wherein said generating step further includes the step of incrementally decreasing during a third time period the coefficients of a port having any of said predetermined priority levels when the port assumes a third state in said plurality of states.

11. The method set forth in claim 7 or 10 wherein said generating step also includes the steps of comparing the composite level for a port having any of said predetermined priority levels with a reference level for the port, adjusting the reference level for the port by a predetermined amount when the composite and the reference levels for the port are different, and mapping the reference level to the coefficient for the port.

12. The method set forth claim 11 wherein said step of adjusting the reference level for the port by a predetermined amount includes the steps of increasing the reference level for the port by a first predetermined amount when the composite level is greater than the reference level and decreasing the reference level for the port by a second predetermined amount when the composite level is less than the reference level.

13. In a digital conference arrangement having a plurality of ports for receiving information samples each representing the level of a signal, apparatus for controlling the signal level represented by an information sample to be included in an output sample for distribution to the ports; comprising:

means for forming a composite level from the signal levels represented by information samples received on a port, means for generating a coefficient in response to said composite level, and means responsive to said coefficient for adjusting the signal level represented by an information sample from the port to be included in an output sample.

14. The apparatus in accordance with claim 13 in which said means for generating a coefficient comprises means for comparing said composite level with a reference level, means for adjusting said reference level by a predetermined amount when said composite and reference levels are different, and means for mapping said reference level to said coefficient.

15. The apparatus in accordance with claim 14 in which said means for adjusting said reference level comprises means for increasing said reference level by a first predetermined amount when said composite level is greater than said reference level and means for decreasing said reference level by a second predetermined amount when said composite level is less than said reference level.

16. In a digital conference arrangement adapted to include in an output sample an information sample from each selected port of a plurality of ports, each sample representing the level of a signal, apparatus for selecting ports; comprising:

means for forming a composite level for each port from the signal levels represented by information samples received on the port;

means for detecting the state of each port in a plurality of states;

means for assigning a priority level to each port based on the composite level for the port and on the detected state of the port; and means for controlling the signal level represented by an information sample from each port to include in an output sample on information sample from a port having any of a plurality of predetermined priority levels.

17. The apparatus in accordance with claim 16 in which said control means comprises means for adjusting the signal level represented by an information sample from a port having any of said predetermined priority levels for inclusion in an output sample and means for setting the signal level represented by an information sample from any other port to a predetermined signal level for exclusion from the output sample.

18. The apparatus in accordance with claim 17 in which said means for adjusting the signal level comprises means for generating a coefficient for a port having any of said predetermined priority levels in response to the composite level for the port, and means responsive to the coefficient for the port for adjusting the signal level represented by an information sample from the port to be included in the output sample.

19. The apparatus in accordance with claim 18 in which said generating means includes means for incrementally increasing during a first time period the coefficients of a port having any of said predetermined priority levels when the port assumes a first state in said plurality of states.

20. The apparatus in accordance with claim 19 in which said generating means also includes means for incrementally decreasing during a second time period the coefficients of a port having any of said predetermined priority levels when the port assumes a second state in said plurality of states.

21. The apparatus in accordance with claim 20 in which said generating means further includes means for incrementally decreasing during a third time period the coefficients of a port having any of said predetermined priority levels when the port assumes a third state in said plurality of states.

22. The apparatus in accordance with claim 18 or 21 in which said generating means further comprises means for comparing the composite level for a port having any of said predetermined priority levels with a reference level, means for adjusting the reference level for the port by a predetermined amount when the composite and the reference levels for the port are different, and means for mapping the reference level to the coefficient for the port.

23. The apparatus in accordance with claim 22 in which said means for adjusting the reference level for the port by a predetermined amount comprises means for increasing the reference level for the port by a first predetermined amount when the composite level is greater than the reference level and means for decreasing the reference level for the port by a second predetermined amount when the composite level is less than the reference level.

24. In a digital conference arrangement having a plurality of ports for receiving information samples each representing the level of a signal, a method for equalizing among the ports the signal level represented by an information sample on each port to be included in an output sample for distribution to the ports; comprising the steps of:
forming a composite level for each port from the signal levels represented by information samples received on the port,
generating for each port a coefficient having a magnitude which varies inversely with the magnitude of the composite level, and
adjusting the signal level represented by an information sample from each port to be included in an output sample in accordance with the coefficient for the port.

25. The method set forth in claim 24 wherein the coefficient and the composite level fro each port have magnitudes C and SL, respectively, and that the coefficient for each port is generated such that the product of C times SL approximates a constant.

26. The method set forth in claim 24 or 25 wherein said step of generating a coefficient for each port includes the steps of comparing the composite level with a reference level for the port, adjusting the reference level by a predetermined amount when the composite and reference reference level to the coefficient for the port.

27. The method set forth in claim 26 wherein said step of adjusting the reference level for each port includes the steps of increasing the reference level for the port by a first predetermined amount when the composite level is greater than the reference level and decreasing the reference level for the port by a second predetermined amount when the composite level is less than the reference level.

28. The method set forth in claim 27 wherein said method further comprises the step of repetitively performing the prior steps during each one of a plurality of time intervals.

29. In a digital conference arrangement having a plurality of ports for receiving information samples each representing the level of a signal, apparatus for equalizing among the ports the signal level represented by an information sample on each port to be included in an output sample for distribution to the ports; comprising:
means for forming a composite level for each port from the signal levels represented by information samples received on the port,
means for generating for each port a coefficient having a magnitude which varies inversely with the magnitude of the composite level, and
means for adjusting the signal level represented by an information sample from each port to be included in an output sample in response to the coefficient for the port.

30. The apparatus in accordance with claim 29 wherein the coefficient and the composite level for each port have magnitudes C and SL, respectively, and that said generating means generates the coefficient for each port such that the product of C times SL approximates a constant.

31. The apparatus in accordance with claim 29 or 30 in which said means for generating a coefficient for each port comprises means for comparing the composite level with a reference level for the port, means for adjusting the reference level by a predetermined amount when the composite and reference levels for the port are different, and means for mapping the reference level to the coefficient for the port.

32. The apparatus in accordance with claim 31 in which said means for adjusting the reference level for each port comprises means for increasing the reference level for the port by a first predetermined amount when the composite level is greater than the reference level and means for decreasing the reference level for the port by a second predetermined amount when the composite level is less than the reference level.

* * * * *

UNITED STATES PATENT AND TRADEMARK OFFICE
CERTIFICATE OF CORRECTION

PATENT NO. : 4,499,578
DATED : February 12, 1985
INVENTOR(S) : Mohamed A. Marouf and Paul W. Vancil It is certified that error appears in the above-identified patent and that said Letters Patent is hereby corrected as shown below:

In the Abstract:

Line 14, "noticeble" should read --noticeable--.

Column 2, line 9, "includes" should read -- included--.

Column 4, line 21,"102" should read --120--.

Column 5, line 46, "120" should read --128--.

Column 8, line 55, "122" should read --133--.

Column 17, line 63, "theinput" should read --the input--.

Column 19, line 26, "AVD" should read --AVC--.

line 55, "wben" should read --when--.

Signed and Sealed this

Twentieth Day of August 1985

[SEAL]

Attest:

DONALD J. QUIGG

Attesting Officer      Acting Commissioner of Patents and Trademarks